United States Patent [19]
Simonetti

[11] Patent Number: 5,823,216
[45] Date of Patent: Oct. 20, 1998

[54] AUTOMATIC AWNING FOR RECREATIONAL VEHICLE

[75] Inventor: Louis Simonetti, Elk Grove, Ill.

[73] Assignee: Zip Dee, Inc., Elk Grove Village, Ill.

[ * ] Notice: The term of this patent shall not extend beyond the expiration date of Pat. No. 5,597,006.

[21] Appl. No.: 775,973

[22] Filed: Jan. 3, 1997

Related U.S. Application Data

[62] Division of Ser. No. 465,975, Jun. 6, 1995, Pat. No. 5,597,006.

[51] Int. Cl.⁶ .................................................... E04F 10/00
[52] U.S. Cl. .................. 135/88.1; 135/88.01; 135/88.12; 135/903; 92/61
[58] Field of Search ............................... 135/88.01, 88.12, 135/903, 117, 88.1; 242/389, 390.2, 390.5, 390.6, 390.7, 390.3; 92/61

[56] References Cited

U.S. PATENT DOCUMENTS

| | | |
|---|---|---|
| 3,324,869 | 6/1967 | Duda . |
| 3,847,171 | 11/1974 | Akers et al. . |
| 4,077,419 | 3/1978 | Lux . |
| 4,160,458 | 7/1979 | Marcellus . |
| 4,171,013 | 10/1979 | Clark . |
| 4,195,877 | 4/1980 | Duda . |
| 4,198,998 | 4/1980 | Duffy . |
| 4,576,192 | 3/1986 | Duda . |
| 4,585,093 | 4/1986 | Barda, Jr. . |
| 4,634,172 | 1/1987 | Duda . |
| 4,733,683 | 3/1988 | Pozzi . |
| 5,016,522 | 5/1991 | Allardin . |
| 5,070,661 | 12/1991 | Lo Guidici ................................ 52/79.1 |
| 5,148,848 | 9/1992 | Murray et al. . |
| 5,368,056 | 11/1994 | Riggi, Jr. . |

*Primary Examiner*—Carl D. Friedman
*Assistant Examiner*—Timothy B. Kang
*Attorney, Agent, or Firm*—Emrich & Dithmar

[57] ABSTRACT

An automatically extendible and retractable awning for a vehicle. Awning material is connected at one end to a recreational vehicle and at the other end to a roller assembly, said roller assembly which is movable between a stored position where the awning material is wrapped around the roller assembly and is positioned adjacent the recreational vehicle and an extended position where the awning material extends away from the recreational vehicle. Mechanism provides energy to the roller assembly to effectuate movement of the roller assembly between the extended and the stored positions. Two support arm assemblies, each being mounted at one end to the recreational vehicle and at the other end to the roller assembly are movable between a stored position where the support arm assemblies are close and generally parallel to the side of the recreational vehicle and an extended position where the support arm assemblies extend away from the recreational vehicle. Two rafter arm assemblies are mounted at one end to the recreational vehicle and at the other end to an associated one of the support arm assemblies and are movable between a retracted position and an extended position where the rafter arm assemblies assist holding the roller assembly in the extended position thereof with the awning material unrolled and extending away from the recreational vehicle. Mechanism using pressurized fluid for operating the support arm assemblies to their extended position when the roller assembly is moving to its extended position thereof.

6 Claims, 26 Drawing Sheets

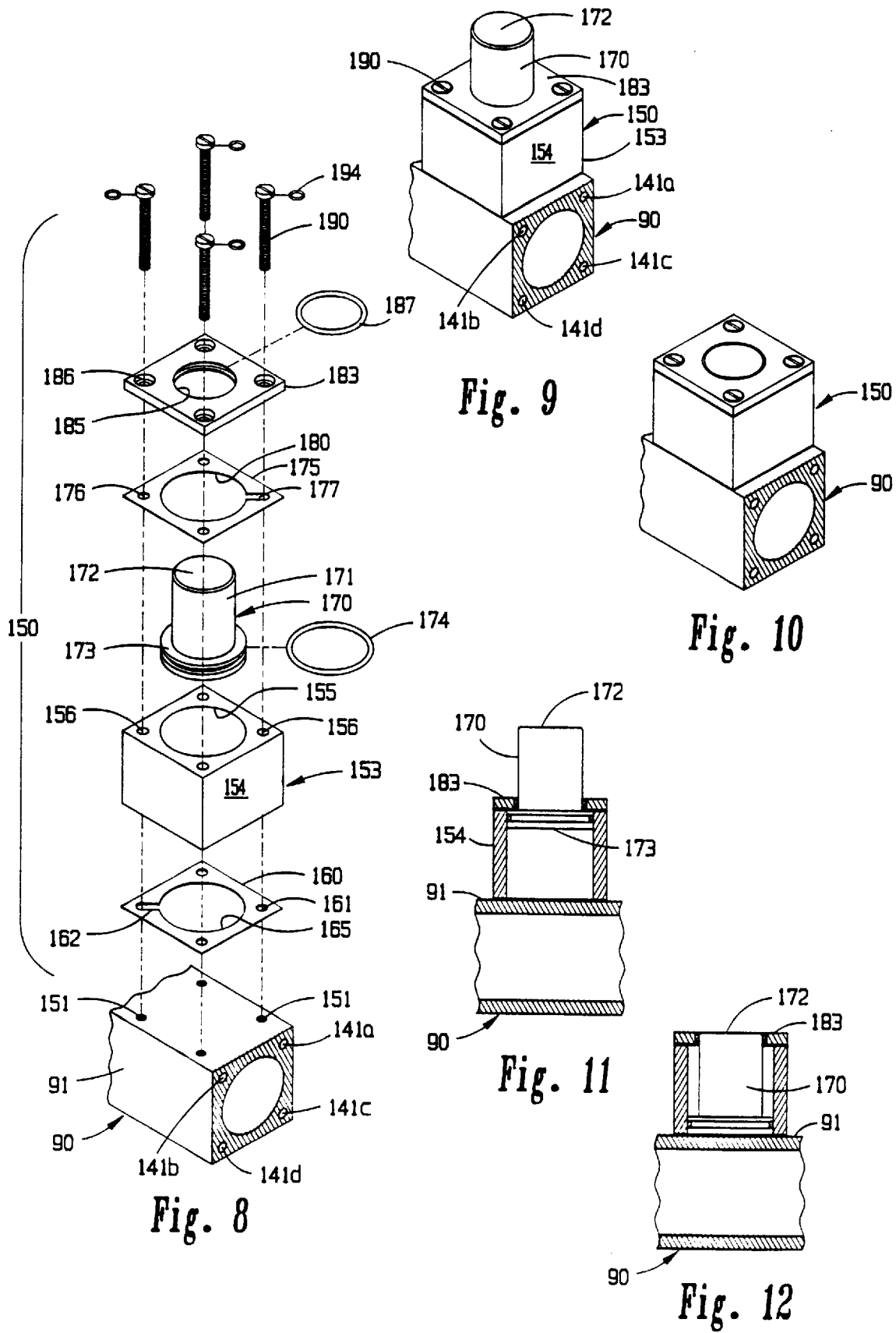

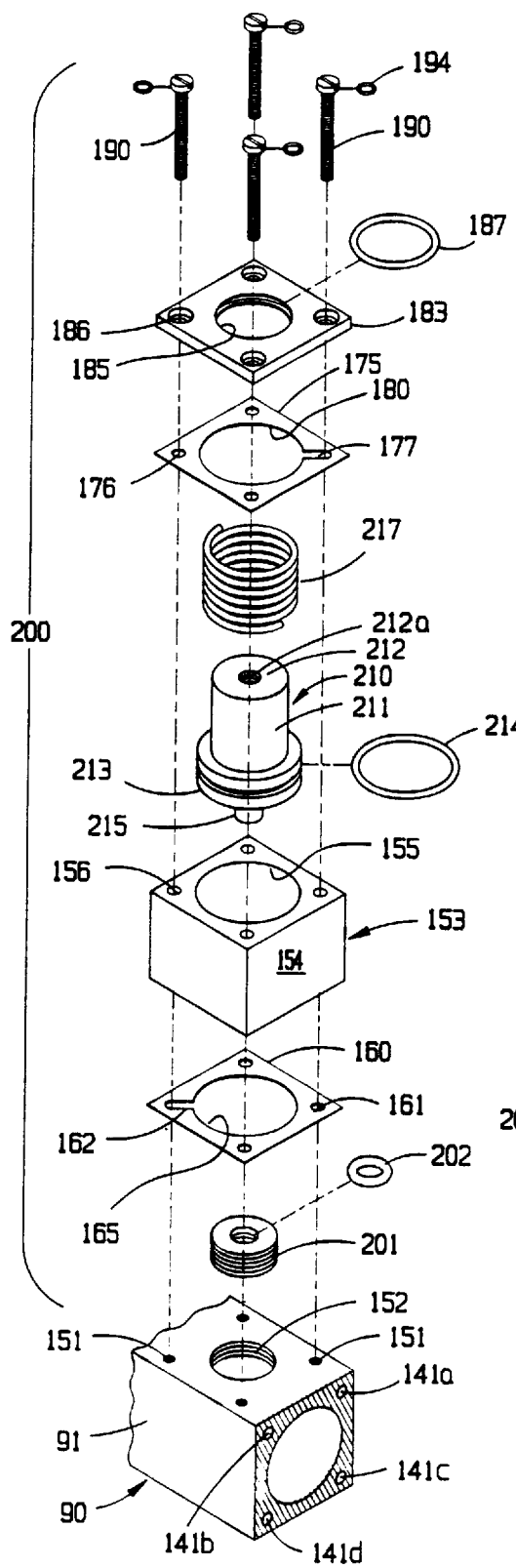
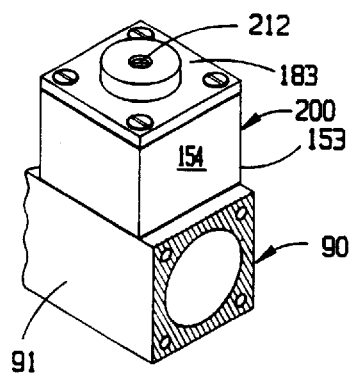
Fig. 14
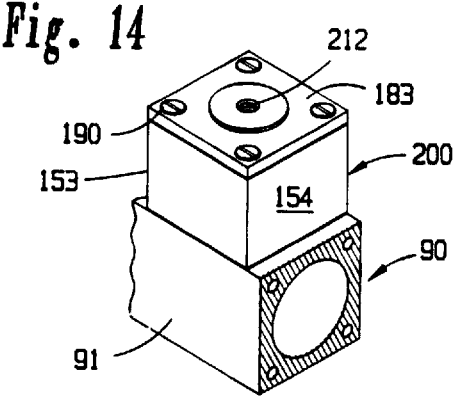
Fig. 15
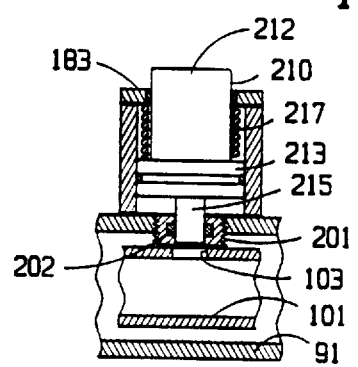
Fig. 16
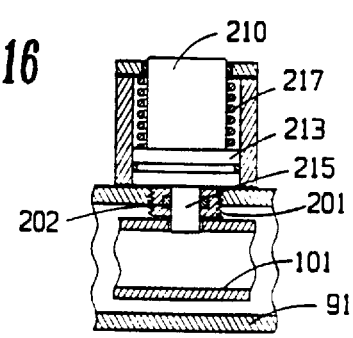
Fig. 13
Fig. 17

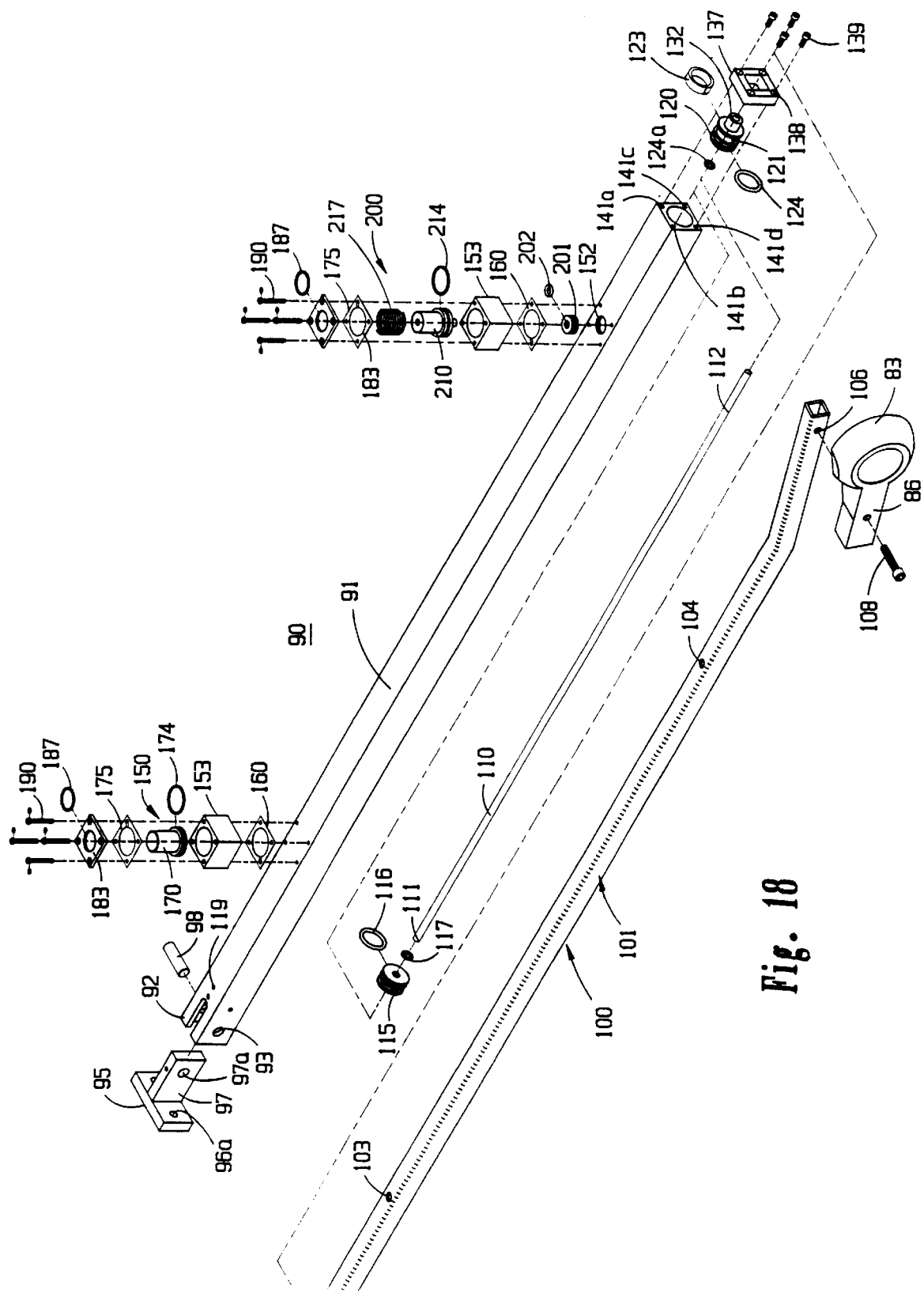

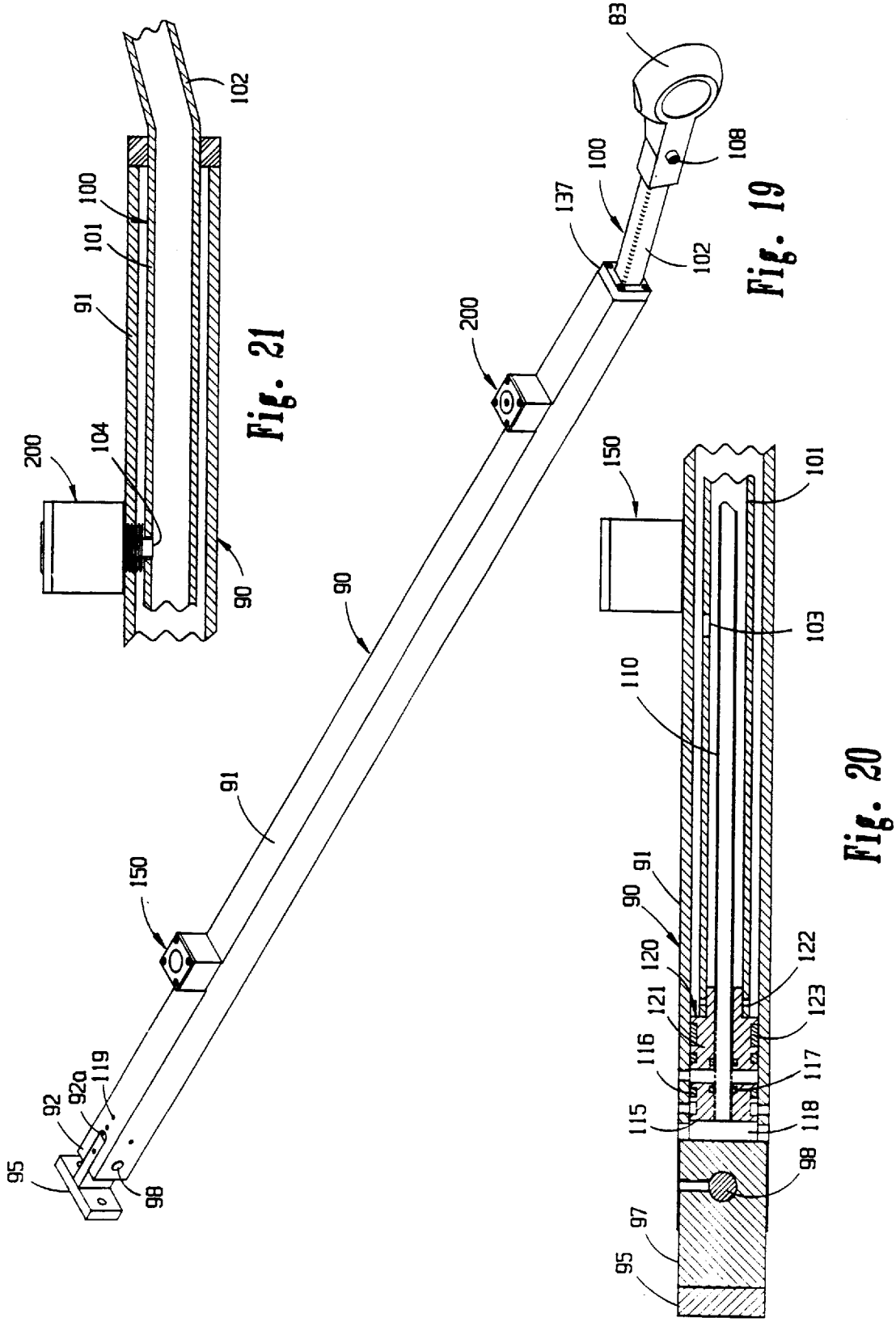

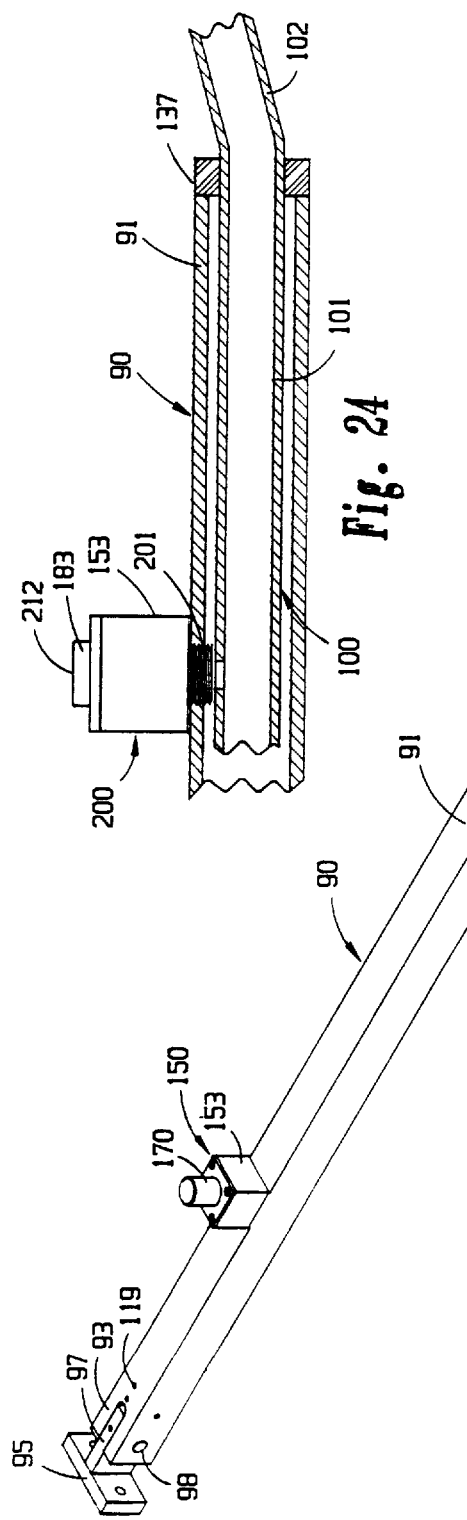
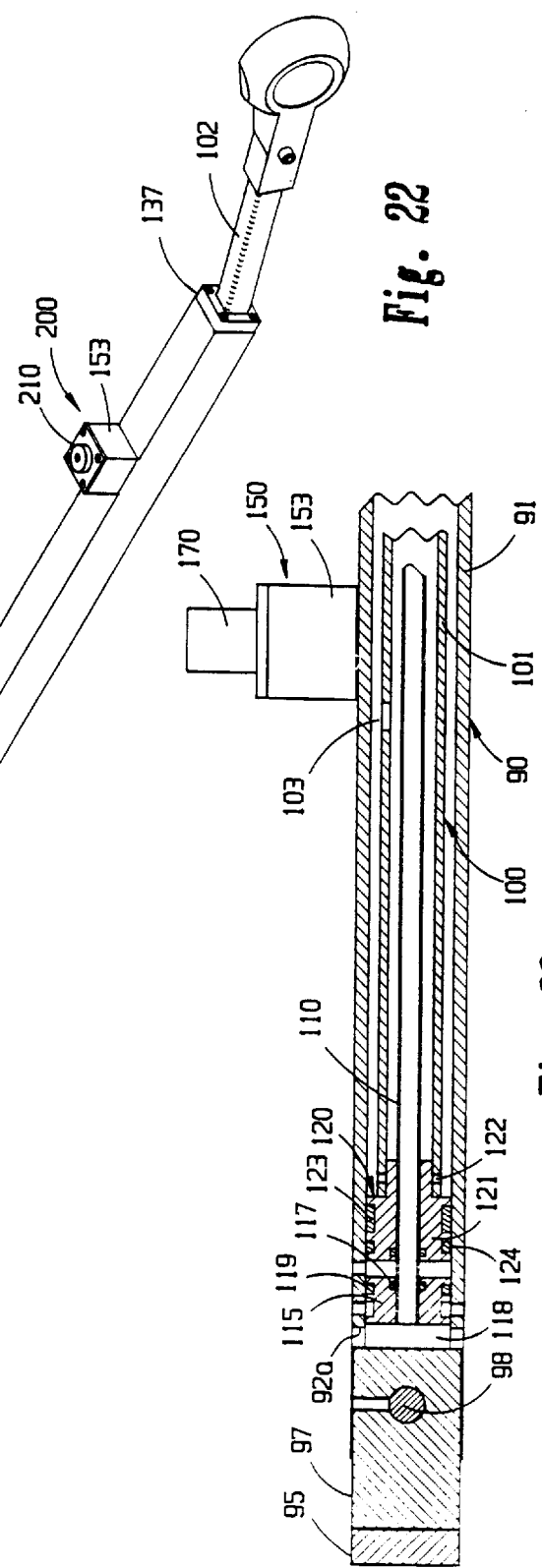

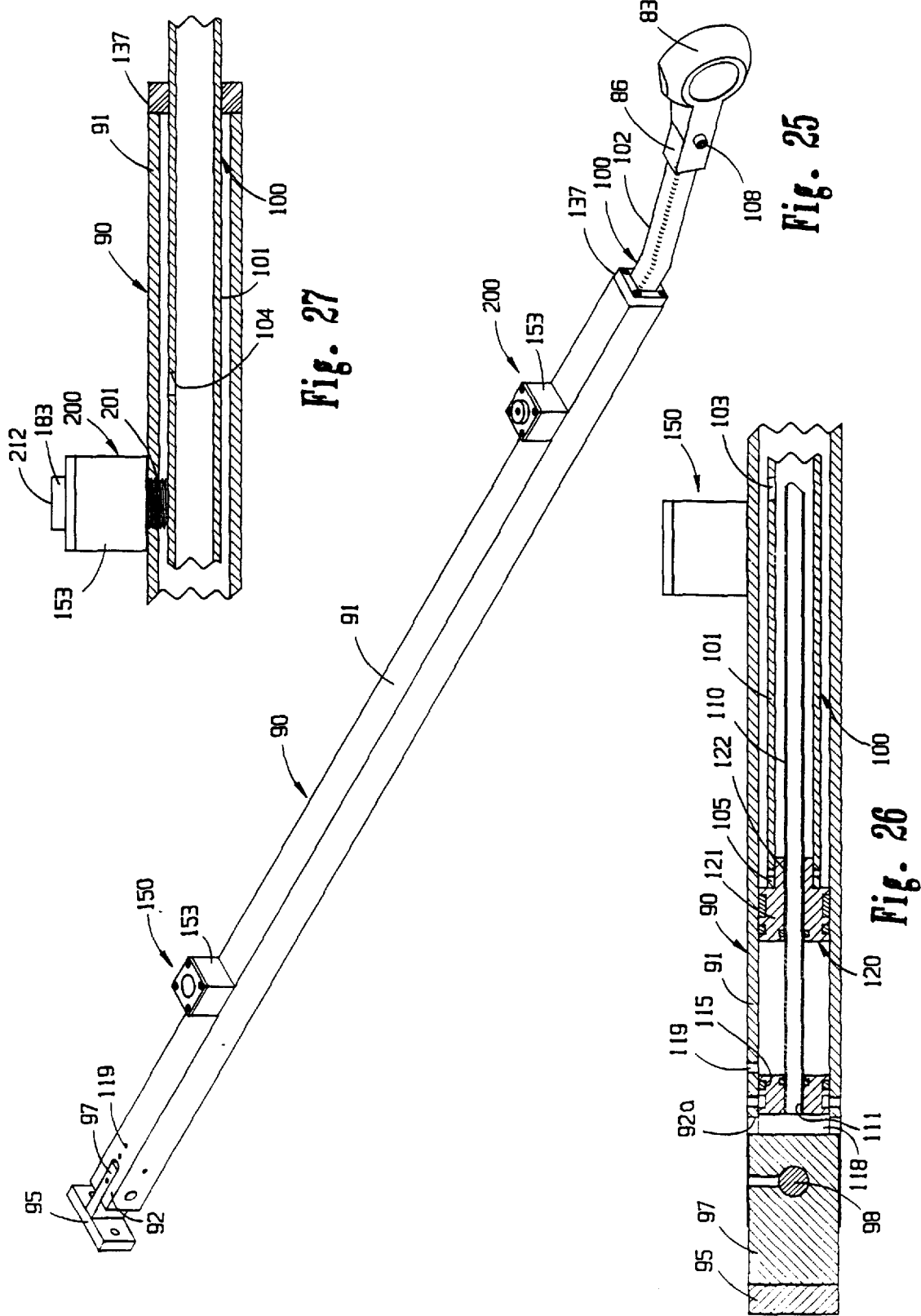

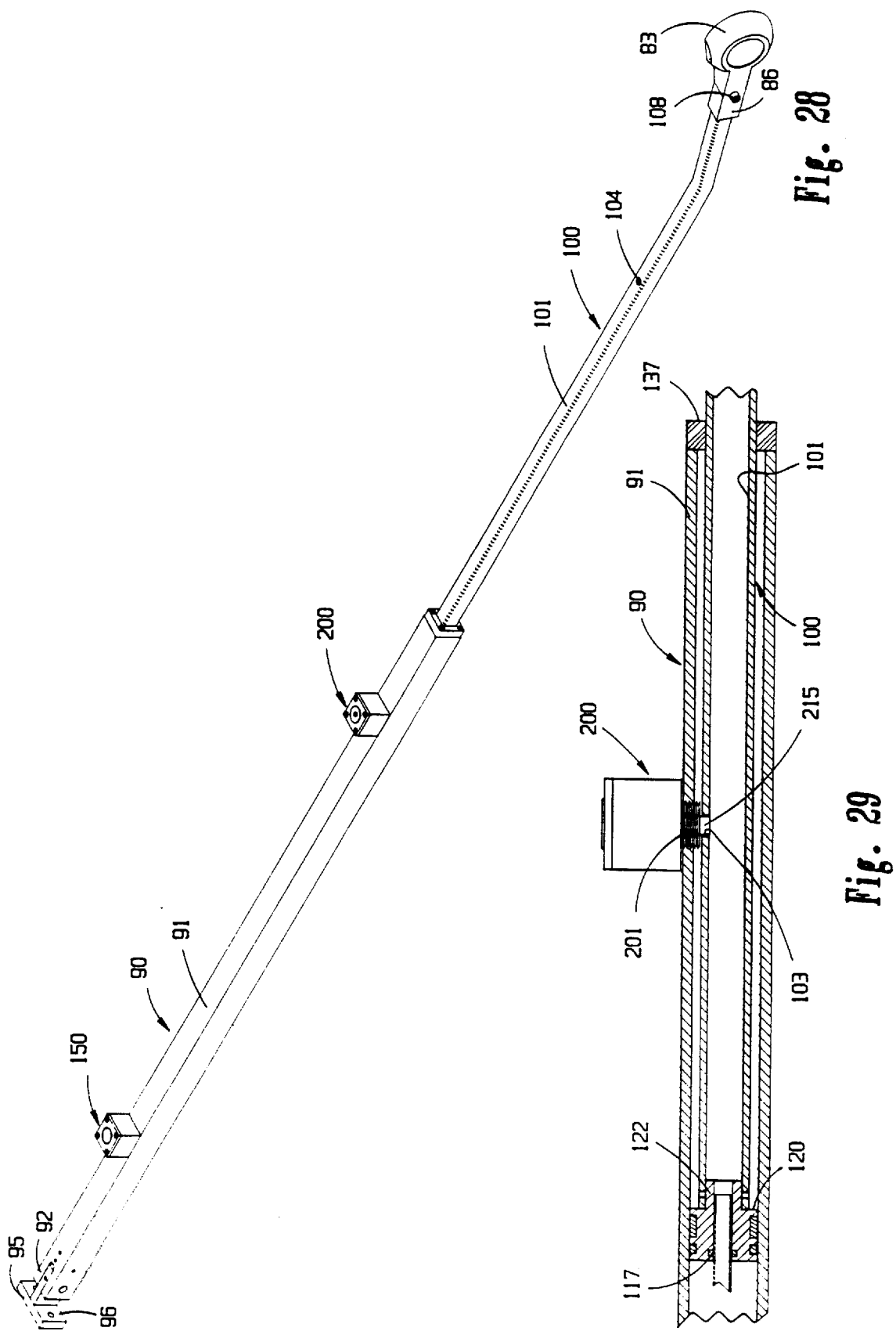

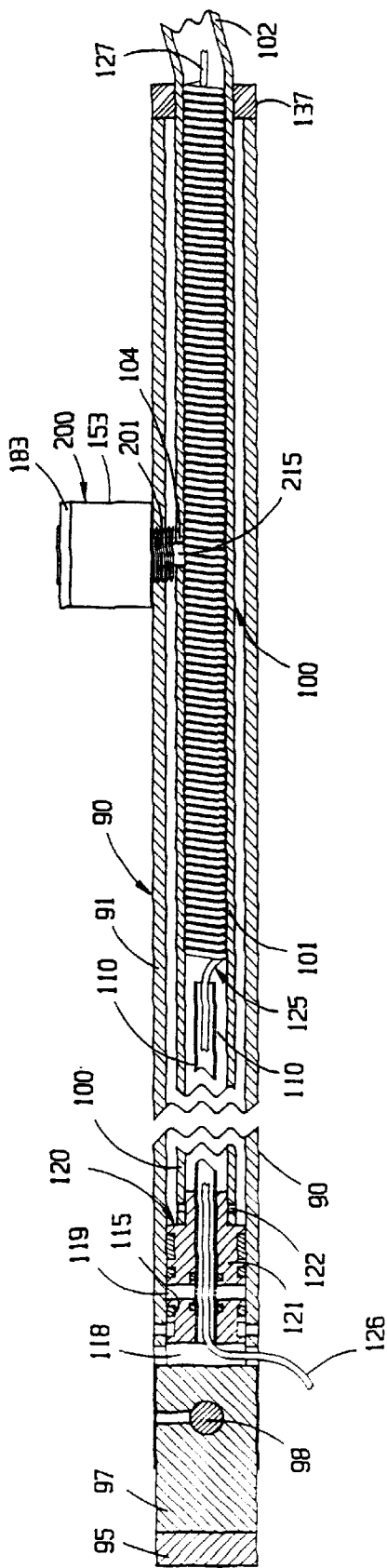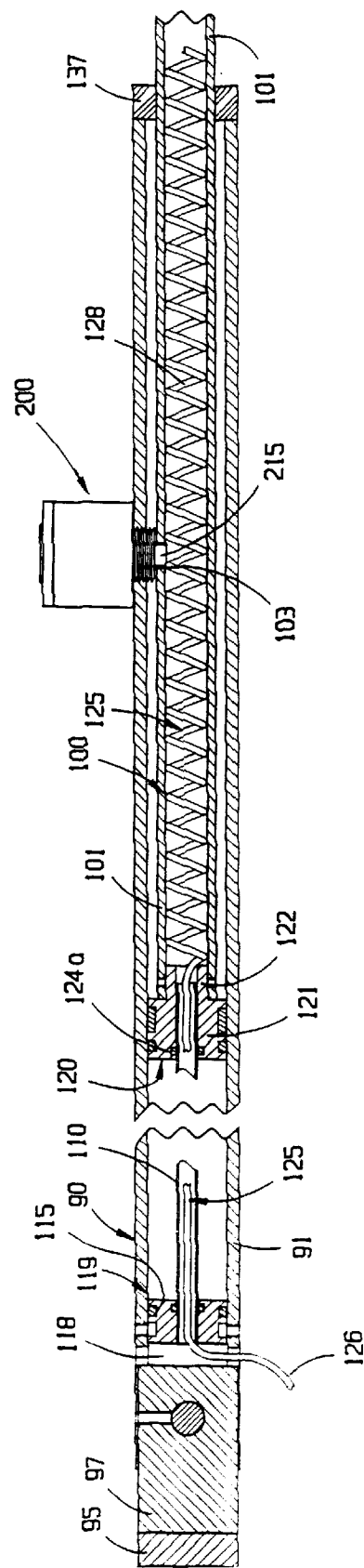

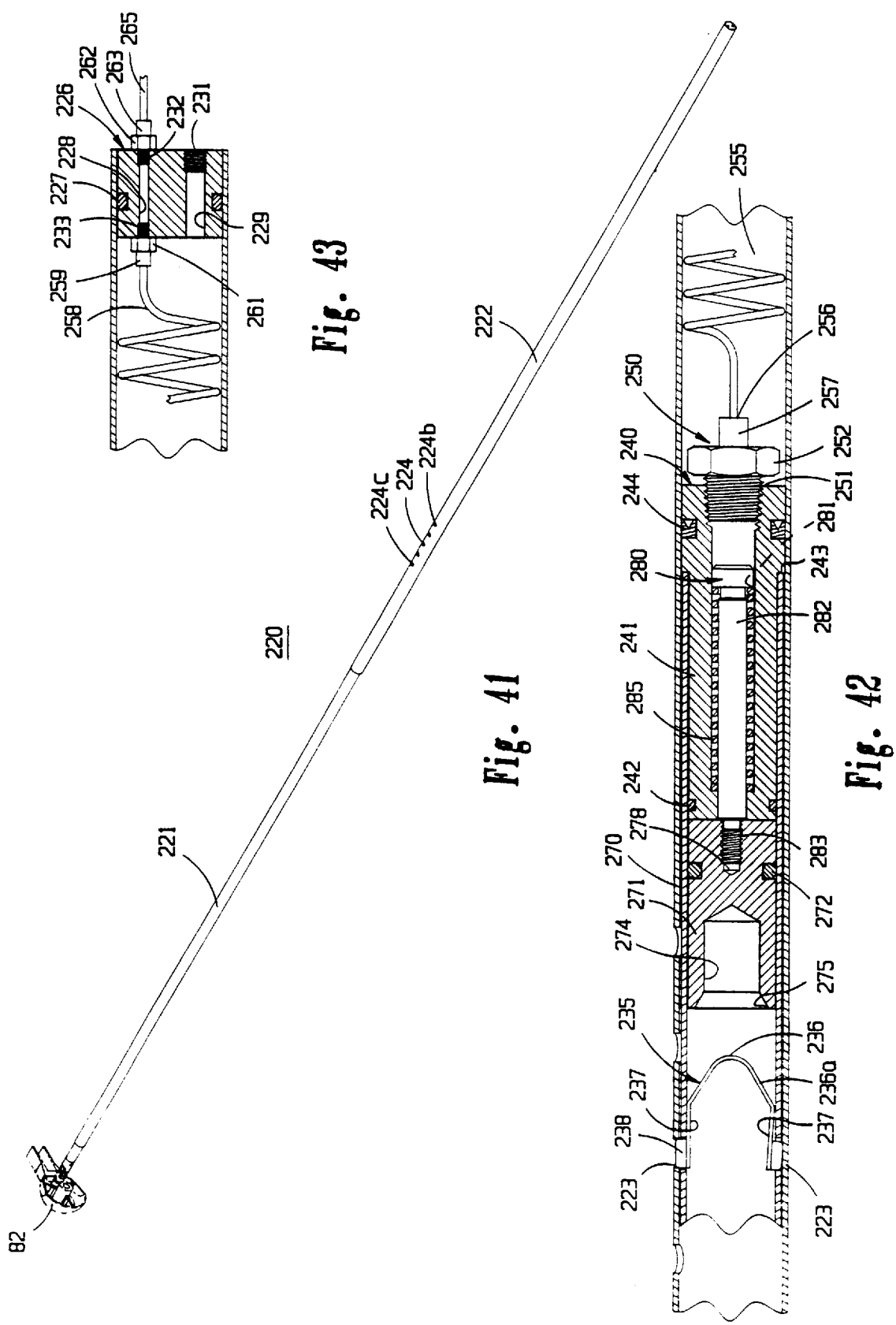

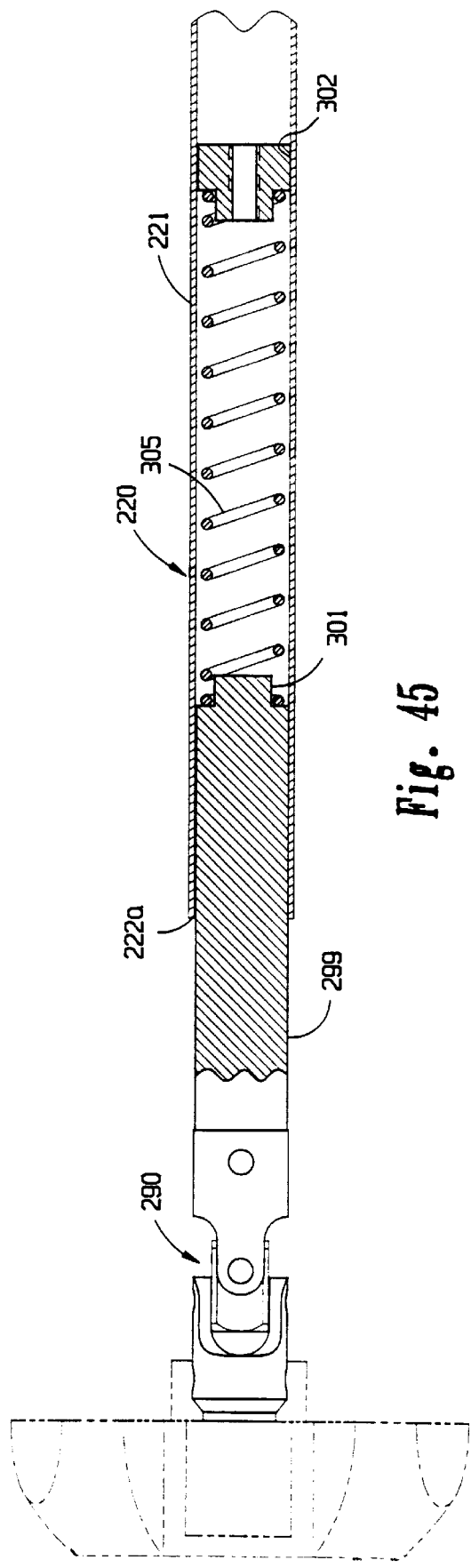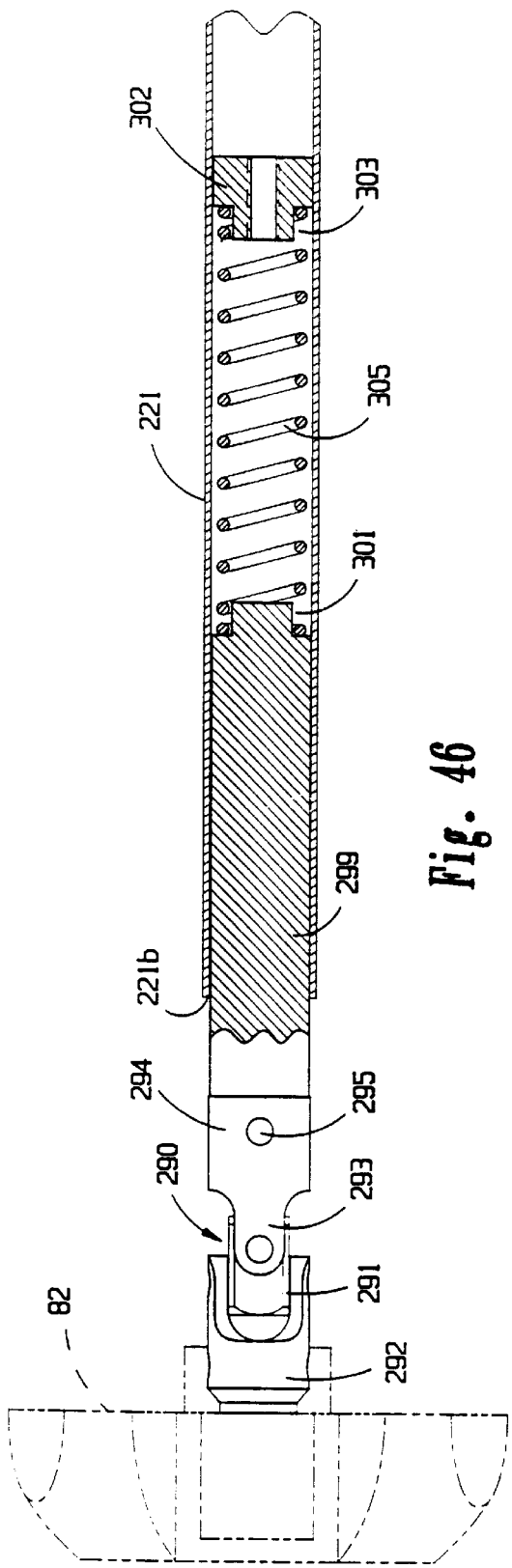
Fig. 45
Fig. 46

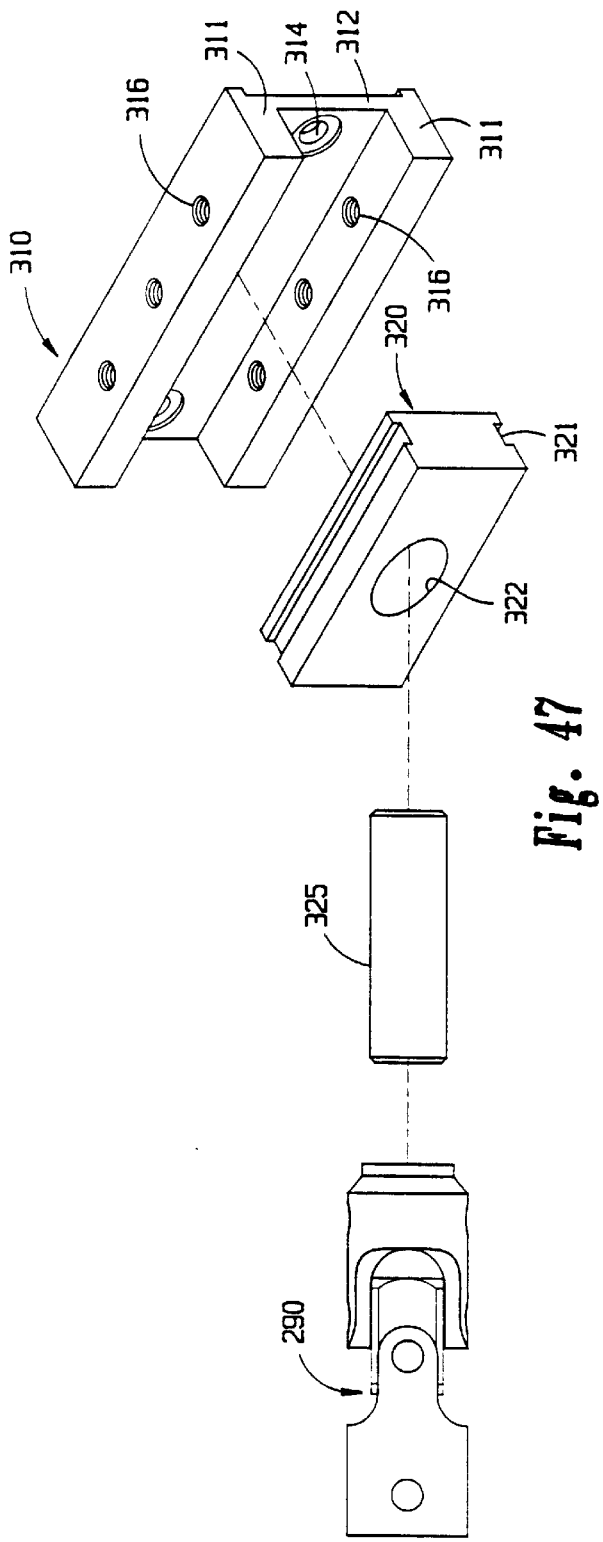
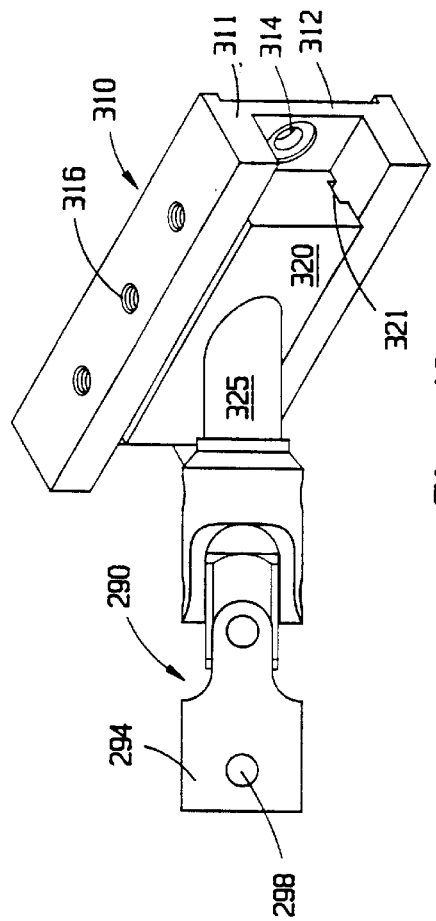
Fig. 47
Fig. 48

FIG. 50

| | THE CHART BELOW INDICATES: ☐ INPUTS ☐ OUTPUTS | CODES ON ● OFF ⊗ |
|---|---|---|

| | TIME | DATA | SECTION "A" 12345678 | SECTION "b" 12345678 | SECTION "c" 12345678 |
|---|---|---|---|---|---|
| STEP 01 | 2.0 | LOWER MTR. | ●●●○○○○○ | ○○○○○○○○ | ○○○○○○○○ |
| STEP 02 | 3.0 | PUSH OFF & RAFT. EXT. | ●●●○●○●○ | ○○○○○○○○ | ○○○○○○○○ |
| STEP 03 | 10.0 | CONT. LOWER/LOCK OFF | ●●●○○●○○ | ○○○○○○○○ | ○○○○○○○○ |
| STEP 04 | 10.0 | RAISE ARMS | ●●●●○○○● | ○○○○○○○○ | ○○○○○○○○ |
| STEP 05 | 10.0 | CONTINUE LOWER | ●●●○○●○○ | ○○○○○○○○ | ○○○○○○○○ |
| STEP 06 | 8.0 | EXT. RAFT MTR. | ○○○○○○●● | ○○○○○○○○ | ○○○○○○○○ |
| STEP 07 | 4.0 | REL. LOCK | ○○○○○○●○ | ○○○○○○○○ | ○○○○○○○○ |
| STEP 08 | 1.0 | FREEZE | ○○○○○○○○ | ○○○○○○○○ | ○○○○○○○○ |
| STEP 09 | 3.0 | RAFT EXT. | ○○○○○○●○ | ○○○○○○○○ | ○○○○○○○○ |
| STEP 10 | 3.0 | RAFT LOCK OPEN | ○○○○○○○● | ○○○○○○○○ | ○○○○○○○○ |
| STEP 11 | 3.0 | RAISE MTR ON PRES ARMS | ●○○●○○○● | ○○○○○○○○ | ○○○○○○○○ |
| STEP 12 | 10.0 | RAISE MTR CONT./LOCK OPEN | ●○○○●○○● | ○○○○○○○○ | ○○○○○○○○ |
| STEP 13 | 20.0 | RAISE MTR CONT./PUSH IN | ●○○○○●○○ | ○○○○○○○○ | ○○○○○○○○ |
| STEP 14 | 1.0 | RESET 1A | ○○○○○○○○ | ○○○○○○○○ | ○○○○○○○○ |
| STEP 15 | | | ○○○○○○○○ | ○○○○○○○○ | ○○○○○○○○ |
| STEP 16 | | | ○○○○○○○○ | ○○○○○○○○ | ○○○○○○○○ |
| STEP 17 | | | ○○○○○○○○ | ○○○○○○○○ | ○○○○○○○○ |
| STEP 18 | | | ○○○○○○○○ | ○○○○○○○○ | ○○○○○○○○ |
| STEP 19 | | | ○○○○○○○○ | ○○○○○○○○ | ○○○○○○○○ |
| STEP 20 | | | ○○○○○○○○ | ○○○○○○○○ | ○○○○○○○○ |
| STEP 21 | | | ○○○○○○○○ | ○○○○○○○○ | ○○○○○○○○ |
| STEP 22 | | | ○○○○○○○○ | ○○○○○○○○ | ○○○○○○○○ |
| STEP 23 | | | ○○○○○○○○ | ○○○○○○○○ | ○○○○○○○○ |
| STEP 24 | | | ○○○○○○○○ | ○○○○○○○○ | ○○○○○○○○ |
| STEP 25 | | | ○○○○○○○○ | ○○○○○○○○ | ○○○○○○○○ |

OUTPUTS (1,2,&3) ON LOWER ROLLER (MTR.)
OUTPUT (1) ON RAISES ROLLER (MTR.)
OUTPUT (4) RAISES MAIN ARM
OUTPUT (5) PUSHES OFF & OPENS MAIN ARM LOCK
OUTPUT (6) RETRACTS PUSH OFF
OUTPUT (7) EXTENDS RAFT ARM
OUTPUT (8) OPEN RAFTER ARM LOCK

FIG. 51

| EQUAL 8A & 8C OUTPUTS→TARGET 5C (8A=MAIN ARM EXTEND LIMIT SWITCH) | THE CHART BELOW INDICATES: ☐ INPUTS ☒ OUTPUTS | CODES ON ● OFF ⊗ |
|---|---|---|

| | TIME | DATA | SECTION "A" 12345678 | SECTION "b" 12345678 | SECTION "c" 12345678 |
|---|---|---|---|---|---|
| STEP 01 | 2.0 | LOWER | ●●●⊗⊗⊗⊗⊗ | ⊗⊗⊗⊗⊗⊗⊗⊗ | ⊗⊗⊗⊗⊗⊗⊗⊗ |
| STEP 02 | 5.0 | PUSH OFF | ●●●⊗●⊗●⊗ | ⊗⊗⊗⊗⊗⊗⊗⊗ | ⊗⊗⊗⊗⊗⊗⊗● |
| STEP 03 | 12.0 | CONTINUE LOWER | ●●●⊗●⊗⊗⊗ | ⊗⊗⊗⊗⊗⊗⊗⊗ | ⊗⊗⊗⊗⊗⊗⊗● |
| STEP 04 | 3.0 | RAISE ARM | ●●●●⊗⊗⊗⊗ | ⊗⊗⊗⊗⊗⊗⊗⊗ | ⊗⊗⊗⊗⊗⊗⊗⊗ |
| STEP 05 | 12.0 | RELEASE LOCK OPEN RAF. LOCK | ●●●⊗⊗⊗⊗⊗ | ⊗⊗⊗⊗⊗⊗⊗⊗ | ⊗⊗⊗⊗⊗⊗⊗⊗ |
| STEP 06 | 8.0 | EXTEND RAFTER | ⊗⊗⊗⊗⊗●●⊗ | ⊗⊗⊗⊗⊗⊗⊗⊗ | ⊗⊗⊗⊗⊗⊗⊗● |
| STEP 07 | 4.0 | PUSH OFF IN RELEASE RAF. LOCK | ⊗⊗⊗⊗⊗●⊗⊗ | ⊗⊗⊗⊗⊗⊗⊗⊗ | ⊗⊗⊗⊗⊗⊗⊗● |
| STEP 08 | 1.0 | FREEZE | ⊗⊗⊗⊗⊗⊗⊗⊗ | ⊗⊗⊗⊗⊗⊗⊗⊗ | ●⊗⊗⊗⊗⊗⊗⊗ |
| STEP 09 | 4.0 | EXTEND RAFTER | ⊗⊗⊗⊗⊗●⊗⊗ | ⊗⊗⊗⊗⊗⊗⊗⊗ | ⊗⊗⊗⊗⊗⊗⊗● |
| STEP 10 | 5.0 | OPEN RAFT LOCK | ⊗⊗⊗⊗⊗⊗●⊗ | ⊗⊗⊗⊗⊗⊗⊗⊗ | ⊗⊗⊗⊗⊗⊗⊗● |
| STEP 11 | 3.0 | RAISE & PRES. ARM | ●⊗⊗●⊗⊗⊗● | ⊗⊗⊗⊗⊗⊗⊗⊗ | ⊗⊗⊗⊗⊗⊗⊗● |
| STEP 12 | 10.0 | REL. ARM LOCK | ●⊗⊗●⊗⊗⊗● | ⊗⊗⊗⊗⊗⊗⊗⊗ | ⊗⊗⊗⊗⊗⊗⊗● |
| STEP 13 | 25.0 | PUSH OFF IN | ●⊗⊗⊗⊗●⊗● | ⊗⊗⊗⊗⊗⊗⊗⊗ | ⊗⊗⊗⊗⊗⊗⊗● |
| STEP 14 | 1.0 | RESET | ⊗⊗⊗⊗⊗⊗⊗⊗ | ⊗⊗⊗⊗⊗⊗⊗⊗ | ⊗●⊗⊗⊗⊗⊗● |
| STEP 15 | | | ⊗⊗⊗⊗⊗⊗⊗⊗ | ⊗⊗⊗⊗⊗⊗⊗⊗ | ⊗⊗⊗⊗⊗⊗⊗⊗ |
| STEP 16 | | | ⊗⊗⊗⊗⊗⊗⊗⊗ | ⊗⊗⊗⊗⊗⊗⊗⊗ | ⊗⊗⊗⊗⊗⊗⊗⊗ |
| STEP 17 | | | ⊗⊗⊗⊗⊗⊗⊗⊗ | ⊗⊗⊗⊗⊗⊗⊗⊗ | ⊗⊗⊗⊗⊗⊗⊗⊗ |
| STEP 18 | | | ⊗⊗⊗⊗⊗⊗⊗⊗ | ⊗⊗⊗⊗⊗⊗⊗⊗ | ⊗⊗⊗⊗⊗⊗⊗⊗ |
| STEP 19 | | | ⊗⊗⊗⊗⊗⊗⊗⊗ | ⊗⊗⊗⊗⊗⊗⊗⊗ | ⊗⊗⊗⊗⊗⊗⊗⊗ |
| STEP 20 | | | ⊗⊗⊗⊗⊗⊗⊗⊗ | ⊗⊗⊗⊗⊗⊗⊗⊗ | ⊗⊗⊗⊗⊗⊗⊗⊗ |
| STEP 21 | | | ⊗⊗⊗⊗⊗⊗⊗⊗ | ⊗⊗⊗⊗⊗⊗⊗⊗ | ⊗⊗⊗⊗⊗⊗⊗⊗ |
| STEP 22 | | | ⊗⊗⊗⊗⊗⊗⊗⊗ | ⊗⊗⊗⊗⊗⊗⊗⊗ | ⊗⊗⊗⊗⊗⊗⊗⊗ |
| STEP 23 | | | ⊗⊗⊗⊗⊗⊗⊗⊗ | ⊗⊗⊗⊗⊗⊗⊗⊗ | ⊗⊗⊗⊗⊗⊗⊗⊗ |
| STEP 24 | | | ⊗⊗⊗⊗⊗⊗⊗⊗ | ⊗⊗⊗⊗⊗⊗⊗⊗ | ⊗⊗⊗⊗⊗⊗⊗⊗ |
| STEP 25 | | | ⊗⊗⊗⊗⊗⊗⊗⊗ | ⊗⊗⊗⊗⊗⊗⊗⊗ | ⊗⊗⊗⊗⊗⊗⊗⊗ |

THIS PROGRAM WILL RESET TO THE RAISE MODE.
(STEPS 9 THRU 14) IF POWER IS TURNED OFF WHEN AWNING IS LOWERED.)

AUTOMATIC AWNING FOR RECREATIONAL VEHICLE

This is a divisional of application Ser. No. 08/465,975, filed Jun. 6, 1995, now U.S. Pat. No. 5,597,006.

BACKGROUND OF THE INVENTION

This invention relates to awnings and, more particularly, to retractable automatic awning assemblies for attachment to recreational vehicles and other vehicles.

Heretofore, awnings mounted on a roller bar and attached to the sides of recreational vehicles, mobile homes, campers and other vehicles, have been extended outwardly and held in place by a pair of support arms attachable at one end to the roller bar with the other end mounted on the sides of the recreational vehicle. Typically, the support arms had been held outwardly by brace or rafter arms which have been held in place by manual locking devices. In most cases, these awnings are raised and lowered manually and no means have been provided for automatically extending and automatically retracting the entire awning apparatus.

Attempts have been made to build automatic retracting and extending features into recreational vehicle awnings, but as of the date of this application, there are no commercially available devices having these features, although U.S. Pat. No. 4,160,458 issued Jul. 10, 1979 to Marcellus and U.S. Pat. No. 4,733,683 issued Mar. 29, 1988 to Pozzi relate to the general subject matter of the invention. Moreover, the assignee of the Pozzi patent, that is Fiamma S.p.A. has advertised an electrically operated awning similar to the awning disclosed in FIG. 8A of the '683 patent. However, to the knowledge of the undersigned, there is no commercially available awning for a vehicle which combines both pneumatic and electrical means for operating the awning and which carry the roller mechanism in a roller bar as is traditionally shown in commercial awnings of the type illustrated by for instance, the Duda U.S. Pat. Nos. 3,324,869, 4,576,192 and 4,634,172 or the Marcellus '683 patent which also shows awnings of this particular type.

SUMMARY OF THE INVENTION

A general object of the invention is to provide a new and improved awning for recreational and other vehicles which is automatically extendible and retractable.

Another object of the invention is to provide an awning for recreational and other vehicles in which pneumatic mechanism is used to effectuate movement of the awning between the stored and extended positions thereof.

Yet another object of the invention is to provide a awning for recreational and other vehicles wherein both pneumatic mechanism as well as mechanical and electrical energy are used to effectuate movement of the awning between the stored and extended position thereof.

Yet another object of the invention is to provide an awning of the type set forth in which both support arm assemblies and rafter arm assemblies are pneumatically assisted between the retracted and extended positions thereof.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 8 is an exploded perspective view of the push-off mechanism of the present invention;

FIG. 9 is a view of the assembled device illustrated in FIG. 8 wherein the push-off piston is in the fully extended position thereof;

FIG. 10 is a view of the assembled device illustrated in FIG. 8 with the piston in the fully retracted position thereof;

FIG. 11 is a view in vertical section of the device illustrated in FIG. 9;

FIG. 12 is a view in vertical section of the device illustrated in FIG. 10;

FIG. 13 is an exploded perspective view of the locking mechanism for the support arm assemblies of the present invention;

FIG. 14 is a view of the assembled lock mechanism illustrated in FIG. 13 in the unlocked position thereof;

FIG. 15 is a view of the assembled locking mechanism illustrated in FIG. 13 in the locked position thereof;

FIG. 16 is a vertical sectional view of the device illustrated in FIG. 14;

FIG. 17 is a vertical sectional view of the device illustrated in FIG. 15;

FIG. 18 is an exploded perspective view of one of the support assemblies of the present invention showing placement of both the push-off assembly and the locking mechanism as well as the relationship between the inner and outer members, the electrical conduit means and the sealing mechanism for the pneumatic fluids;

FIG. 19 is a view of one of the two support assemblies of the present invention with the inner and outer members assembled and fully retracted, with the push-off cylinder in the retracted position thereof and the locking mechanism in the locked position thereof;

FIG. 20 is a view of a portion of the support assembly illustrated in FIG. 19 partially in section showing the means for mounting the support assembly to the recreational vehicle with the push-off cylinder in the retracted position thereof;

FIG. 21 is a view of a portion of the arm illustrated in FIG. 19 partially in section showing the locking mechanism in the locked position thereof;

FIG. 22 is a view of the support assembly illustrated in FIG. 19 with the push-off cylinder in the extended position thereof and the locking mechanism in the unlocked position thereof;

FIG. 23 is a view like FIG. 20 with the push-off cylinder in the extended position thereof;

FIG. 24 is a view like FIG. 21 with the locking mechanism in the unlocked position thereof;

FIG. 25 is a view like FIGS. 19 and 22 with the push-off cylinder in the retracted position thereof and the locking mechanism in the unlocked position thereof.

FIG. 26 is a view like FIG. 20 showing movement of the support assembly from the fully retracted position thereof;

FIG. 27 is a view like FIG. 24 showing the support assembly further along in the movement from the fully retracted or storage position thereof to the extended position thereof;

FIG. 28 is a view like FIG. 19 of the support assembly in the fully extended position thereof with the push-off cylinder in the fully retracted position thereof and the locking mechanism in the locked position thereof;

FIG. 29 is a view of a portion of FIG. 28 partiallly in section showing the locking mechanism in the locked position thereof;

FIG. 35 is a view partially in section of a support assembly of the present invention in the retracted position thereof showing the means for connecting the electrical motor and the roller assembly;

FIG. 36 is a view like FIG. 35 with the support assembly in the fully extended position thereof showing the relative position of the electrical connectors;

FIG. 41 is a view like FIG. 38 in its assembled and retracted position thereof in its assembled and fully expanded position thereof;

FIG. 42 is a view like FIG. 39 showing the relationship of the locking mechanism and unlocking mechanism with the rafter arms in their fully extended position thereof;

FIG. 43 is a view similar to FIG. 40 showing the relationship of the pneumatic connections when the rafter arm is in the extended position thereof;

FIG. 45 is a view partly in section of the rafter arm assembly connected to the support arm assembly near the end cap for the roller assembly showing the shock absorber mechanism and the universal joint of the rafter arm assembly;

FIG. 46 is a view like FIG. 47 showing the shock absorber mechanism in a compressed position thereof;

FIG. 47 is an exploded view of the mechanism connecting each rafter arm assembly to the recreational vehicle;

FIG. 48 is a view of the portion of the rafter arm mounting assembly illustrated in FIG. 49 in the assembled condition thereof;

FIG. 50 is a schematic illustration of the function programming chart for the controller operating the pneumatic and electrical mechanisms;

FIG. 51 is a schematic illustration of another function programming chart for the controller operating the pn eumatic and electrical systems.

DESCRIPTION OF THE PREFERRED EMBODIMENT

Figure 1:
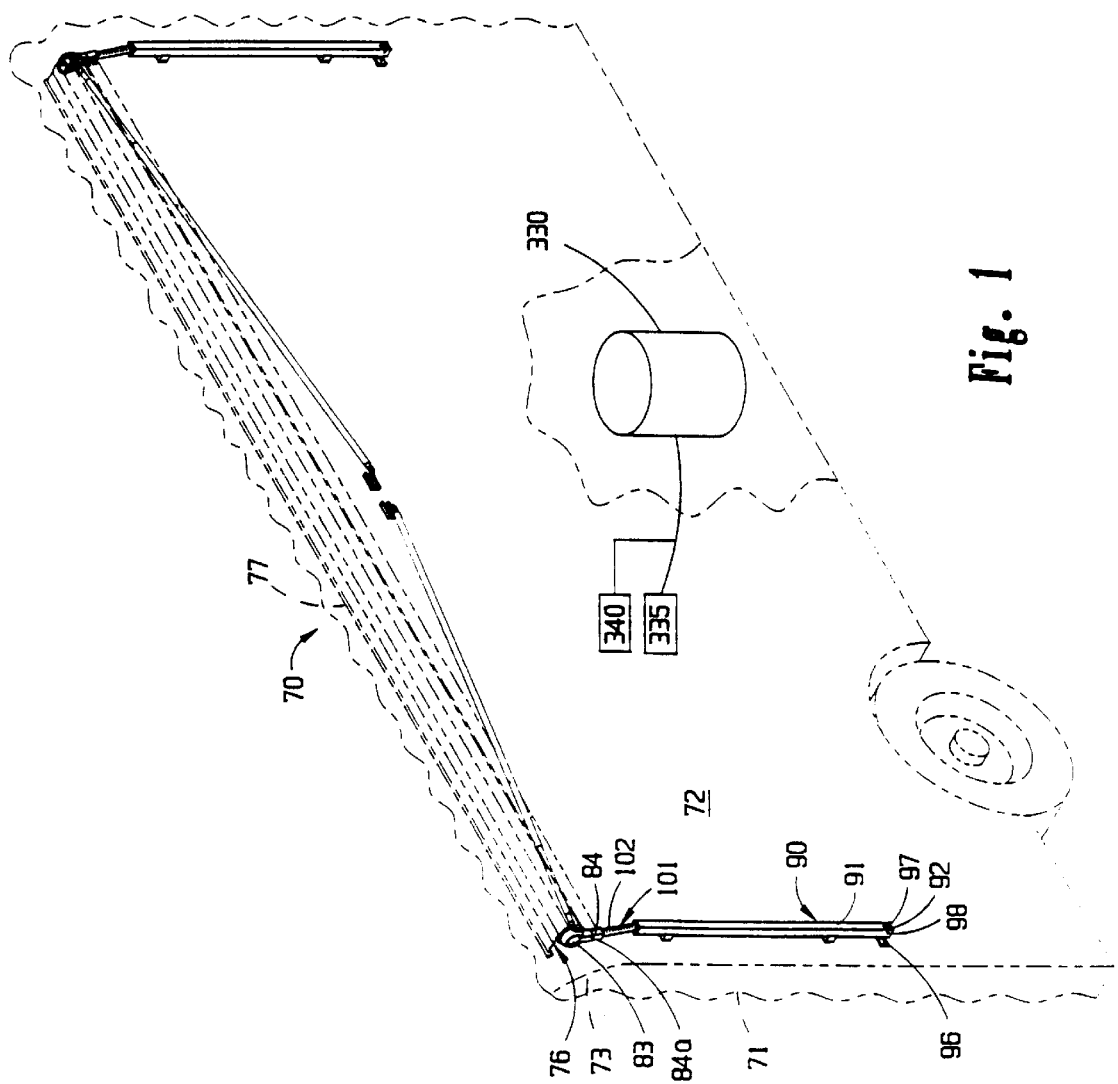
FIG. 1 is a side elevational view of a recreational vehicle having an automatic awning mounted thereon in the fully closed and stored position thereof.
Figure 2:
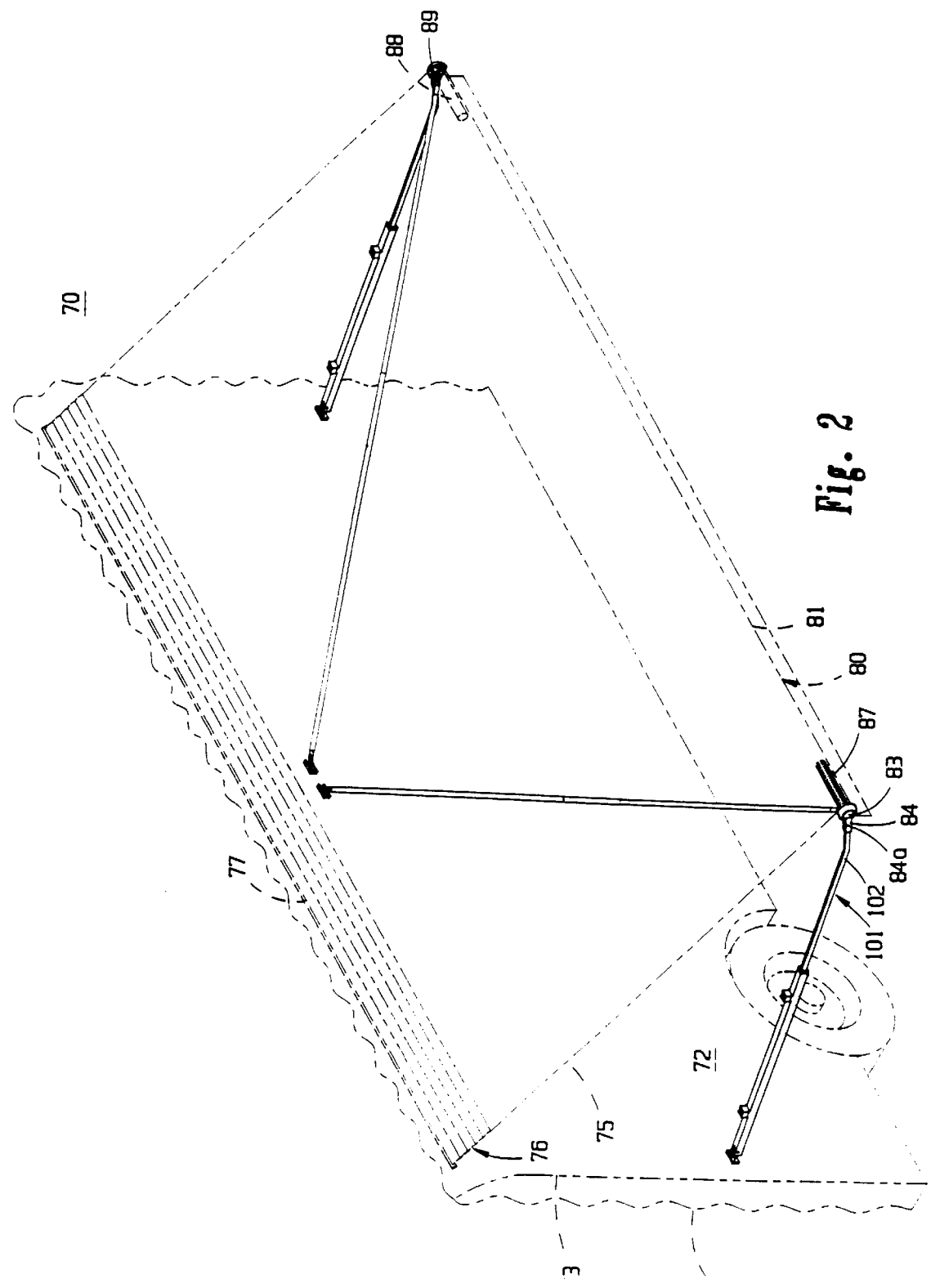
FIG. 2 is a view like FIG. 1 with the awning in the fully open or extended and locked position thereof.

Referring now to FIGS. 1 and 2, there is illustrated an automatic awning 70 attached to a recreational vehicle 71 (hereafter RV) and more particularly to a side wall 72 having an upper arcuate portion 73. Generally, RV's 71 are either straight sided or curved with the invention being illustrated for a curved sided RV. However, it is understood that the automatic awning 70 may be mounted on a straight side RV just as easily or for that matter on vehicles other than recreational vehicles. The use of recreational vehicles herein is for purposes of illustration only, and should not be construed as limiting the scope of the invention.

The automatic awning 70 has a generally rectangular awning fabric 75 connected at one end to a slatted metal cover 76 comprised of individual articulated slats 77 connected at one end thereof to the RV 71 and connected at one end 78 thereof to the awning material 75. Connection of the slatted metal cover 76 to the RV may be by a mechanism illustrated in the previously referenced Duda '172 patent. The overall configuration of the slatted cover is being a registered trademark of Zip Dee, Inc.

At the other end of the awning fabric 75 away from the RV 71 and the slatted metal cover 76 connected thereto is a roller assembly 80. The roller assembly 80 includes a roller tube 81 attached at one end to a casting 82 and at the other end to a casting 83, the castings being separate from the roller assembly. An attachment member 84 extends from the casting 83 and a similar attachment member 86 extends from the casting 82, each of the attachment members 84 and 86 being provided with a corresponding aperture 84a and 86a. Mounted in the roller tube 81 is a torsion spring 87 near the casting 83 and a dc electric motor 88 near the casting 82, all for purposes hereinafter set forth. The castings 82 and 83 are identical to each other except that one is the mirror image of the other.

Connected to each casting 82 and 83 is a support arm assembly 90 as best seen in FIGS. 2 and 18–25. Each support arm assembly includes an outer tubular member 91 which is illustrated as being square in transverse cross-section provided with a slot 92a at one end thereof which forms a clevis 92 and an aperture 93 which extends through the sides of the clevis 92. A mounting plate 95 is mounted to the side 72 of the RV 71 includes apertures 96a for suitable fasteners 96, a perpendicularly extending tongue 97 having an aperture 97a therein to which is mounted the clevis 92 at the end of the outer tubular member 91. A pin 98 inserted through the apertures 93a and 97a pivotally mount the support arm assemblies 90 to the side 72 of the RV 71.

An inner member 100 in the form of a tube 101 square in transverse cross-section has an angled portion 102 and two apertures 103 and 104, the aperture 103 being near an end 105 and the aperture 104, which is optional, being near the juncture between the angled or extension portion 102 and the straight portion 101 of the inner tubular member. An aperture 106 extends through the side walls of the inner member 100, which is mounted to the appropriate casting 82 or 83 by means of a pin 108. A set screw or the like (not shown) prevents the inner member 100 from disengaging from the outer member 91.

As best seen in FIGS. 18 and 20, an elongated wire feed tube 110 has ends 111 and 112, the end 111 being mounted in a support arm end cap 115 having a large O-ring 116 which forms a seal between the end cap 115 and the outer tubular member 91 and a small O-ring 117 which forms a seal between the end cap 115 and the wire feed tube 110. As best seen in FIGS. 20, 23 and 26, when the inner member 100 is fully retracted into the outer member 91 such that the juncture between the angular extension portion 102 and the straight portion 101 is at the end of the outer member 91, a space 118 exists between the end of the support arm end cap 115 and the distal end of the tongue 97.

Inner arm cap and piston assembly 120 includes a piston portion 121 which seals the smaller inner member 100 and the larger outer member 91, the piston portion 121 having a portion 122 smaller in diameter which extends into the inner member 100. Preferably, the outer diameter of the piston portion 121 is about equal to the inner diameter of the tube 91 and the outer diameter of the portion 122 is equal to the inner diameter or just larger than the inner diameter of the inner member 100. A piston wear ring 123 is mounted in an annular groove in the piston as are O-rings 124 and 124a, respectively, to seal the pistons position 121 to the inner surface of outer member 91 and to seal the piston portion to the wire feed tube 110. Alternatively, the piston 121 may be plastic to avoid the need for the rings 123.

As best seen in FIGS. 35 and 36, a wire 125 having an end 126 which extends through the space 118 and into the wire feed tube 110 is connected to a source of electrical energy such as a battery or RV generator or the like. The wire 125 has at the other end 127 thereof extended through the inner tube 100 and particularly through the portion 102 as will be hereafter explained for connection to motor 88. Intermediate ends 126 and 127 is an expandable coil portion 128 which is, when the support assembly is in its retracted position as illustrated in FIG. 35, in a tightly coiled configuration and when the inner member 100 is slid to its extended position with respect to the outer member 91 is expanded as illustrated in FIG. 36 to accommodate the difference in lengths of the support assemblies 90.

Finally, there is provided an end cap 137 at the end of the arm 91 away from the clevis 92. The end cap 137 has a central circular aperture 138 coaxial with the circular aperture of the tube 91 and is provided with four openings at the corner 138 to receive fasteners 139 to mount the end cap 137 to the tube 91, the outer tubular member 91 also being provided with four axially extending channels 141a, 141b, 141c and 141d, see FIGS. 8, 13, 32 and 34.

Mounted on each of the support arm assemblies 90 is a push-off mechanism 150. The push-off mechanism 150 is mounted near the clevis 92, for a purpose hereinafter set forth.

Referring now to FIGS. 8–12, 18, 22–24 and 30–34, and specifically referring to FIG. 8, there is shown a push-off mechanism 150 which is mounted to the outer tubular member 91 in registry with four apertures 151 in the top surface of the outer tubular member. The push-off member 50 includes a housing member 153 which is a section, for convenience purposes only, of the tube 91 so that the housing 53 like the tube 91 is square in transverse cross section having four sides 154 and a cylindrical bore 155 extending through. Four apertures 156 are positioned in the housing 151 so as to be in registry with the apertures 154, the apertures 156 being somewhat oversized with respect to the apertures 151, for a purpose hereinafter set forth.

A gasket 160 is positioned intermediate the bottom of the housing 153 and the top of the outer member 91 and has three circular apertures 161 in three of the corners in registry with three out of four apertures 156 in the housing 153 and in registry with three out of the four apertures 151 in the member 91. A slot 162 extends from a large circular aperture 165 in the gasket 160, the diameter of the aperture 165 being substantially the same as the diameter of the cylindrical bore 155 in the housing 153. The slot 162 in gasket 160 interconnects the aperture 165 and extends to a position where it is in registry with the apertures 151 and 156.

A piston 170 has a cylindrical portion 171 having a top surface or contact surface 170 and an annular head 173 in which is formed an annular groove to receive therein an O-ring or gasket 174. The diameter of the piston head 173 is such to fit inside the bore 155 of the housing 153 with the gasket or O-ring 174 forming a seal between the cylindrical wall of the bore 155 and the piston head 173. A gasket 175 fits over the top of the housing 153 and is substantially the same construction as the gasket 160 with the only difference being the rotation of the slot 180°. The gasket 175 is structurally the same as the gasket 160 but different reference numerals have been applied since the gasket 175 is rotated. More specifically, the gasket 175 includes three apertures 176 at the corners thereof in registry with three out of the four apertures 156 and a outwardly extending slot 177 in registry with an aperture 156 180° from the aperture 156 in registry with the slot 162. The circular aperture 180 in the center of the gasket 175 is the same diameter as the aperture 165 and the central bore 155.

Figure 30:
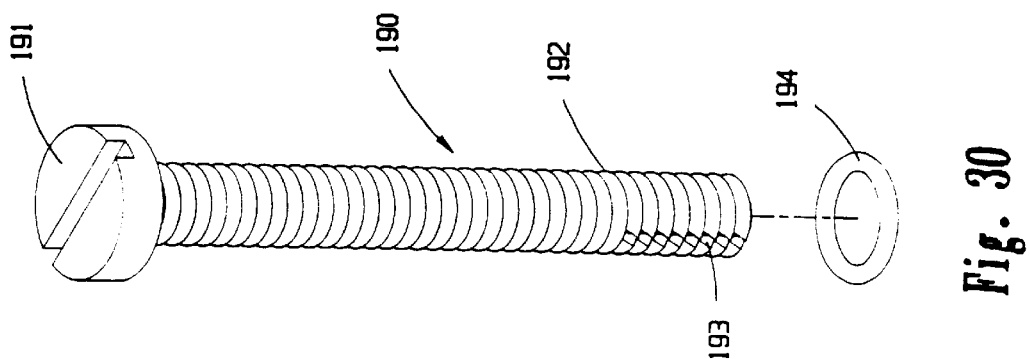
FIG. 30 is an enlarged elevational view of a locking bolt used for mounting push-off cylinders and locking mechanism to the support assemblies and for conveying pneumatic fluid to the push-off cylinders and locking mechanism.

A housing cover 183 fits over the gasket 175 and has four apertures 186, in registry with the apertures 161 and 151. The housing cover 183 is provided with a circular opening 185 smaller than the bore 155 but of a diameter to accommodate the piston cylinder 171 with an O-ring 187 being positioned on the inside periphery of the opening 185 to form a seal between the housing cover 183 and the piston 171. Connectors 190, as best seen in FIG. 30, have the usual slotted head 191 and external threads 192 which are provided with an axially extending slot 193 in a portion of the threads near the distal end of the fastener 190. A gasket or O-ring 194 is provided to form a seal between the housing cover 183 and the head 191 of the fasteners 190. The connections between the channels 141a–141d and the piston 171 will be explained hereafter but the flow path for pneumatic fluid which preferably is compressed air is into member 91 via aperture 119 then along one or more channels 141 a–d through the slots 193 in the appropriate fasteners 190 and upwardly through the oversized apertures 156, all as will be hereinafter explained.

Referring now to FIGS. 13–17 and 18–21, there is shown a support arm locking mechanism 200 which in many respects uses the same parts as the previously described push-off piston or mechanism 150. To the extent that the parts used in the support arm locking mechanism 200 are the same as that previously described with respect to the push-off mechanism 150, the reference numbers assigned the two are the same. The support arm locking mechanism 200 is provided with the same housing 153 having the same corner apertures 156 and central bore 155. The gasket 160 positioned intermediate the bottom of housing 153 and the top of the adjacent portion of the outer tubular member 91 is the same. However, in the outer tubular member 91 in registry with the locking mechanism 200, there is a cylindrical tapped lock opening 152, best seen in FIG. 13.

Locking piston 210 has a cylindrical portion 211 with a flat top surface 212 having a tapped hole 212a, the cylindrical portion 211 terminating in an annular head portion 213 provided with a O-ring 214 receiving groove in the head. The diameter of the head 213 is substantially the same as the diameter of the cylindrical bore 155 so that the head 213 with the O-ring 214 provides the same function as the previously described head 173 and O-ring 174 in the push-off mechanism 150. The piston 210 is further provided with a locking member 215 extending downwardly from the head 213 in the form of a short stub cylinder which is slidingly received within a lock bushing 201 which is externally threaded and an O-ring 202, as seen in FIGS. 13, 16 and 17. The bushing 201 is threadedly received within the aperture 152 in a manner to provide a seal with respect to the pneumatic fluid. A coil spring 217 positioned over the piston 211 bears against the piston head 213 and the bottom of the gasket 175 and cover 183 positioned thereover, thereby to bias the piston 210 into the locked position illustrated in FIG. 17. The introduction of pneumatic fluid, hereinafter described, between the outside of the outer tubular member 91 and bottom of the piston head 213 moves the piston from the locked position illustrated in FIG. 17 to the unlocked position illustrated in FIG. 16.

Figure 37:
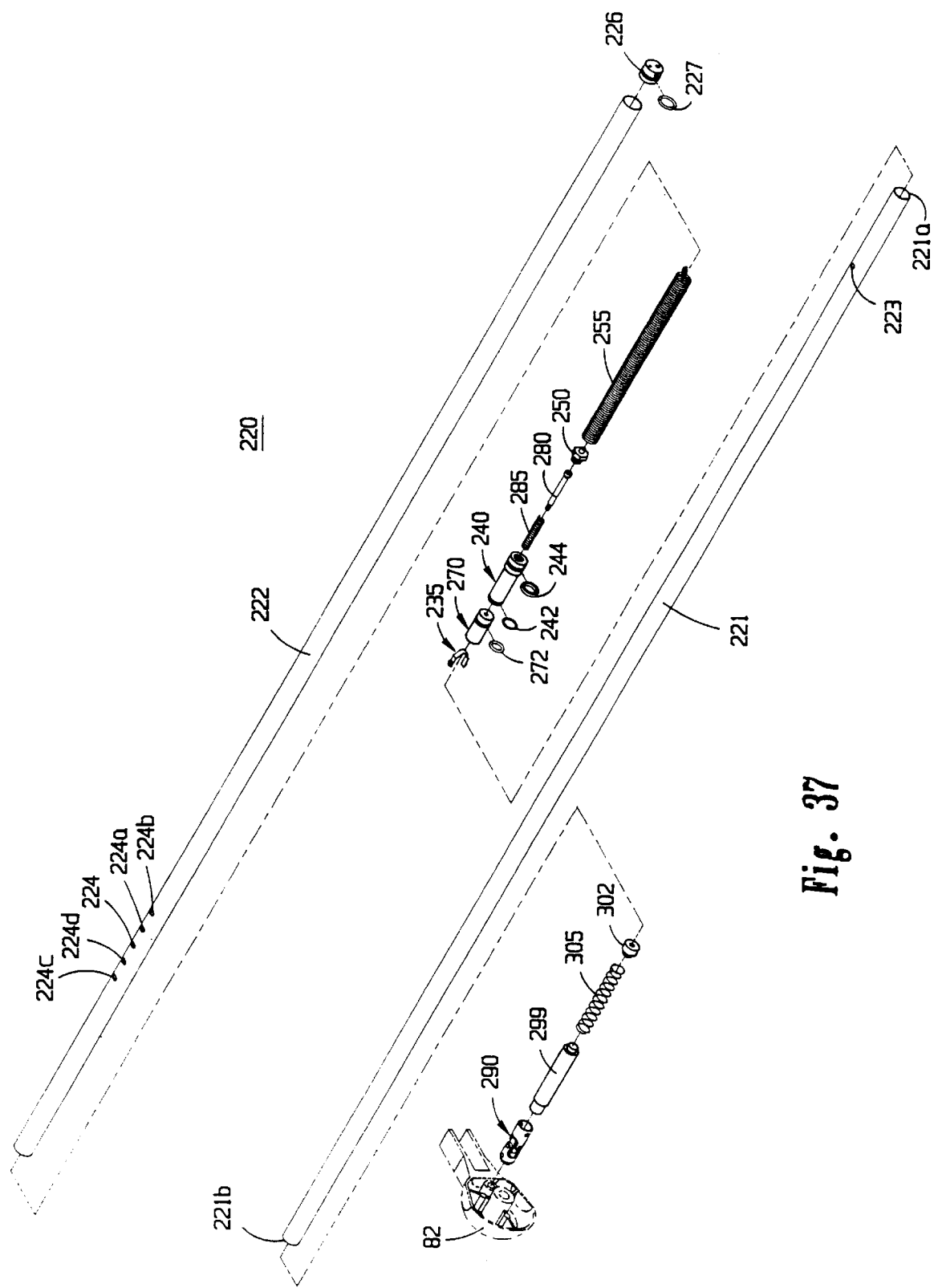
FIG. 37 is an exploded perspective view of one of the rafter arm assemblies of the present invention.
Figure 40:
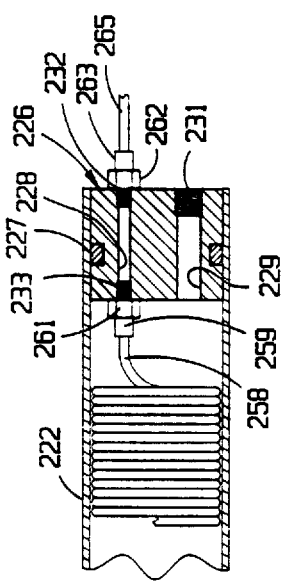
FIG. 40 is a view partially in section of mechanism for connecting a source of pneumatic fluids to the rafter arm of the present invention at the end of the rafter arm mounted to the recreational vehicle.

Referring now to FIGS. 37–48 there is shown a rafter arm assembly 220 of which there are two each being pneumatically assisted as will be explained. Each of the rafter arm assemblies 220 includes an inner tube 221 circular in transverse cross section having an end 221a and an end 221b, as best seen in FIG. 37. There is an aperture 223 in the tube 221 near the end 221a. An outer tube 220, also circular in cross-section has an inner diameter such that the inner tube 221 is slidingly received within the outer tube 222. The outer tube 222 is provided with a plurality of apertures 224, five such apertures being shown and denoted by numerals 224 and 224a–d. The outer tube 222 of the rafter arm assembly 220 has an end plug 226, best seen in FIGS. 40 to 44 mounted in the end of the outer tube 222 adjacent the RV 71. The end plug 226 includes an annular groove receiving an O-ring 227. There are two bores extending through the end plug 226, a small cylindrical bore 228 and a larger cylindrical bore 229. Referring now to FIG. 40, the end plug 26 is provided with a threaded fitting 31 within the cylindrical bore 229 near the exterior surface of the end plug 226. There is also provided a threaded fitting 232 inside the cylindrical bore 228 near the outer surface thereof and a threaded fitting 233 at the other end of the cylindrical bore 228, thereby to provide the ability to receive threaded connections into the end plug 226.

Figure 39:
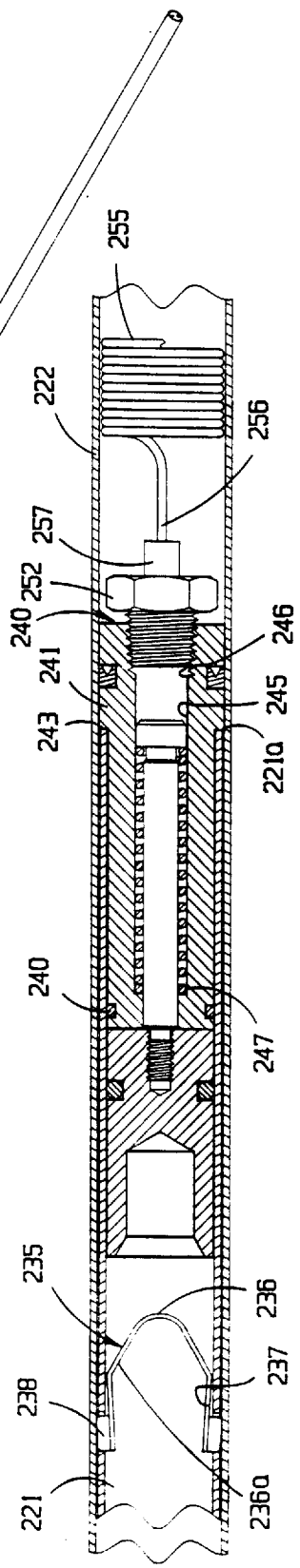
FIG. 39 is an enlarged sectional view of a portion of the rafter arm assembly illustrated in FIGS. 37 and 38 particularly showing the locking mechanism and the pneumatically operated unlocking mechanism therefor.

A snap lock 235 is positioned inside the inner tube 221 and includes a curved spring portion 236 having straight angled portions 236a and legs 237. At the ends of the legs 237 and extending outwardly perpendicularly thereto are button locking members 238. The button locking members 238 are positioned in registry with the apertures 223 in the inner tube 221 which depending on its position may be in registry with any one of the five apertures 224 and 224a–224d in the outer tube 222. Because the snap lock 235 is made of a resilient material such as spring steel, it is biased to the locked position thereof, that is where the button locking members 238 are engaged in the two apertures 223 in the inner tube 221, as seen in FIGS. 39 and 42, and if in alignment with apertures 224 in the outer tube 222 then in engagement with the outer tube 222 defining those apertures. It should be clear from FIG. 42 that the button locking members 238 have a sufficient dimension such that they engage both the inner tube 221 and the outer tube 222 when the tubes are in position so that the openings 223 are in registry with any one of openings 224 or 224a–d.

A rafter arm piston assembly is illustrated in FIGS. 37, 39, 42 and 45. The rafter arm piston assembly 240 includes a piston 241 which has a portion thereof which has an external diameter equal to the internal diameter of the outer tube 222 and a portion thereof which has an external diameter equal to the internal diameter of the inner tube 221. An O-ring 242 seals the smaller portion of the piston 241 to the interior of the inner tube 221 and a sealing member 244 which seals the larger portion of the piston 241 to the outer tubular member 222. A shoulder 243 defines the juncture between the larger and smaller portions of the piston 241 against which the end 221a of the inner tube 221 abuts.

The rafter arm piston assembly 240 and particularly the piston 241 thereof has a central axially extending bore 245 provided with internal threads 246 at the end thereof positioned within the larger portion of the piston, the piston 241 having a shoulder 247 at the end of the bore 245, see FIG. 39. A bore 248 smaller in diameter than the bore 245 extends forwardly of the shoulder 247 in the piston 241, for a purpose hereinafter set forth.

A fixture 250 having external threads 251 and a nut 252 is threadedly received into the internal threads 246 at the end of the piston 241 closest to the end plug 226 and connects an expandable hose 255 via an end 256 thereof to a fitting 257 in fluid communication with the bore 245 to the bore 228 via an end 258 thereof. The end 258 of hose 255 is connected to a fitting 259 received into an externally threaded fixture 261 mounted into the internally threaded end 233 of the bore 228. At the other end of the bore 228 the internal threads 232 thereof receive a externally threaded fixture 262 and a fitting 263 which leads to a hose 265 adapted to be connected to a source of pressurized fluid which may be oil, or preferably compressed air.

The rafter arm snap lock 235 is moved between its locked and unlocked position by means of a rafter arm lock cam assembly 270. The rafter arm lock cam assembly 270 includes a body portion 271 which is cylindrical and has an outer diameter slidably received within the inner tube 221 and is sealed thereto by an O-ring 272. The body 271 of the rafter arm lock cam assembly 270 is provided with a cylindrical bore 274 at one end thereof which has a frusto-conical cam surface 275 at the exterior surface of the body portion 271 and particularly at the portion of the bore 274 which intersects the outer end surface of the body 271.

At the other end of the body 271 of the rafter arm lock cam assembly 270 is an internally threaded bore 278. A cam rod 280 connects the rafter arm piston assembly 240 to the rafter arm lock cam assembly 270. More particularly, the cam rod 280 has a head 281 larger in circumference than the shank portion 282, the shank portion having a terminal end portion which is externally threaded at 283 which is reduced diameter with respect to the other part of the shank 282 and is threadedly received in the bore 278 in the body 271. A spring 285 is positioned between the head 281 of the cam rod 280 and the shoulder 247 formed in the piston body 241.

Referring now to FIGS. 45–48 there is shown the mechanism by which the rafter arm assemblies 220 are connected at one end to the castings 82, 83 connected indirectly to the roller assembly 80 via hardware and at the other end to the RV 71. More particularly, a universal joint 290 is connected at the far end of the inner tube 221, that is end 221*b*. The universal joint 290 includes a clevis member 291 mounted to another clevis member 292 rotated at 90° with respect to the clevis member 291 and mounted to a portion of the casting 82 and more particularly, to the attachment member 86 to the casting 82. Extending axially from a clevis 293 is a body portion 294 pivotally connected by means of a pin 295 to a stub rod or shaft 299 which fits securely within the inner tubular member 221. The stub rod or shaft 299 has a spring receiver 301 in the form of a reduced diameter portion at the end of the stub shaft 299 inside the inner tube 221. A spring stop 302 is fixedly positioned at a point axially removed from the spring receiver 301 inside the inner tube 221 and has a spring receiver or reduced area portion 303 thereon. A spring 305 is mounted between the fixed spring stop 302 and the slidable stub shaft 299. The described construction acts as a shock absorber for the rafter arm assemblies 220, for a purpose hereinafter set forth.

Referring specifically to FIG. 47 and 48, universal joint 290 provides means by which the rafter arm assemblies 220 are mounted to the vehicle 71 and more specifically to the side 72 thereof with a rafter arm assembly mounting base member 310. The mounting base member 310 is generally U-shaped in transverse cross-section having a pair of legs 311 extending perpendicularly from an interconnecting bight 312. A plurality of apertures 314 are positioned axially spaced apart along the bight 312 and a plurality of internally threaded apertures 316 are positioned in each of the legs 311. A rafter arm adjustment 320 has a mount groove 321 in each axially extending edge thereof and an opening 322 in the inner face thereof. A connecting pin 325 serves to connect one end of the universal joint 290 to the outer tube member 222 and to the rafter arm adjustment mount 320. The mount 320 is maintained in the rafter arm mounting base member 310 by a plurality of externally threaded set screws received in the internally threaded apertures 316 to mount the two rafter arm assemblies 220 to side 72 of the RV 71.

Finally, there is provided an air compressor 330 illustrated in FIG. 1 which is operatively connected to the support arm assemblies 90 and to the rafter arm assemblies 220. Electrical connections (not shown) serve to connect an electrical supply in the recreational vehicle 71 with the electrical motor 88 in the roller assembly 80.

Operation of the automatic awning mechanism 70 is hereinafter set forth. As seen in the drawings, the automatic awning 70 is movable between a storage position illustrated in FIG. 1 and in extended position illustrated in FIG. 7. In the storage position, the support assemblies 90 are in their fully retracted position while in FIG. 7 the support assemblies 90 are in their fully extended position. Similarly in FIG. 1, the rafter arm assemblies 220 are in their fully retracted position while in FIG. 7 they are in their fully extended position. In FIG. 1 the roller assembly 80 is in its storage position adjacent to the recreational vehicle 71 while in FIG. 7 when the awning 70 is in its fully extended position the roller assembly 80 is far away from the side 72 of the RV 71, and the awning fabric 75 is taut.

Referring now to FIGS. 1, 19, 20 and 21, when the awning 70 is in its fully rolled up or stored position, the support assemblies 90 are in the fully retracted or stored position thereof. In this position, the push-off mechanism 150 has the piston 170 thereof fully retracted as seen in FIGS. 19, 20 and 25 and the support assembly locking mechanism 200 can be in either the locked position thereof as illustrated in FIG. 21 or in the unlocked position thereof illustrated in FIG. 27. At the present time, it is contemplated that the support arm locking mechanism 200 is still spring biased toward the locked position thereof when the support assembly 90 is in its fully retracted or stored position but that aperture 104 is absent so that no locking occurs. When the support assembly 90 is in its fully retracted or stored position, if locking occurs the aperture 104 in the inner member 101 is substantially in alignment with the locking member 215 of the support arm locking mechanism 200, as illustrated in FIG. 21. Whether the locking member 215 is extended into the aperture 104 so as to lock the support arm assembly 90 depends on the existence of the aperture 104 in each support assembly.

Assuming that the locking mechanism 200 is not locked, then movement of the awning 70 from its storage position to its extended position begins with activation of the electric motor 88 which is connected by wires 125 to a source of electrical energy such as a generator or battery in the RV 71. As illustrated in FIG. 2, the support assembly 90 which carries the electrical connector 125 is the right hand support assembly as viewed looking toward the recreational vehicle 71. The wire 125 includes a coiled portion 128 which permits expansion of the wire during movement of the support assemblies 90 from the storage or retracted position thereof to the extended position thereof. The motor 88 is either a 12 volt dc or 24 volt dc motor. One aspect of the invention is the ability to install the motor 88 within the roller assembly 80 while at the same time using a motor which is sufficiently low in weight to permit the entire awning assembly 70 to be installed on the side of a RV 71 without modification of the vehicle. When electrical energy is directed to the motor 88, the motor begins to unwind such that the awning fabric 75 is unwound several turns, see FIG. 3.

Figure 34:
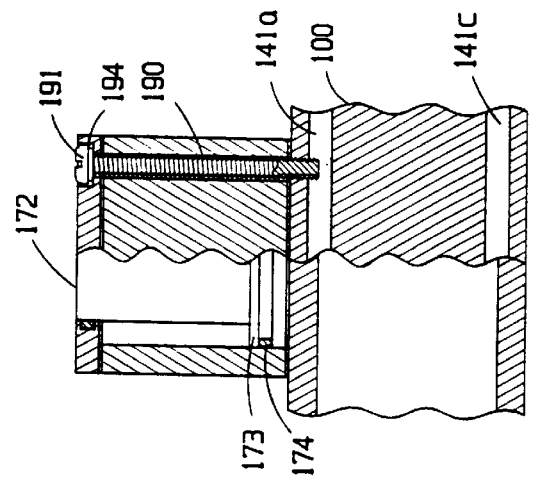
FIG. 34 is a view partially in section of the push-off cylinder of FIG. 33 as seen along line 34—34 thereof.
Figure 31:
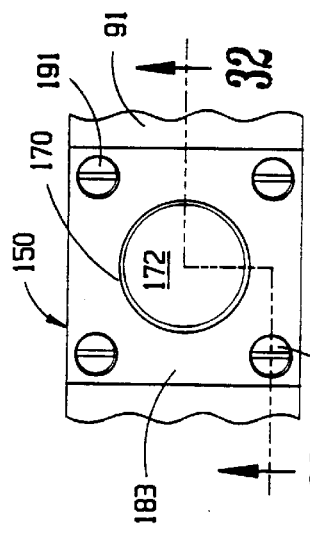
FIG. 31 is a top plan view of the push-off cylinder in the extended position thereof.
Figure 32:
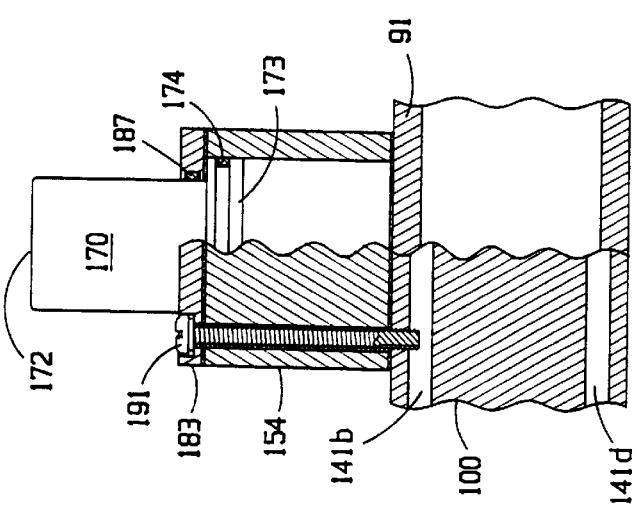
FIG. 32 is a view partially in section of the push-off cylinder illustrated in FIG. 31 as seen along lines 32—32 thereof.

Simultaneously therewith or soon thereafter, such as by about two seconds, the push-off mechanism 150 mounted on each support assembly 90 is pneumatically moved from their retracted positions as illustrated in FIG. 20 to its extended position as illustrated in FIG. 22. More particularly FIGS. 8–12 and 30–34 illustrate the means by which the push-off cylinders 150 move from their retracted position as illustrated in FIG. 34 to the extended position as illustrated in FIG. 32 and thereafter return. Pneumatic fluid in the form of compressed air is directed along a passageway which includes the opening 141*b* in the outer member 91 extends upwardly through the aperture 151 which is possible because of the slot 193 and the threaded fastener 190. The compressed air, for instance, will then pass upwardly through the slot 162 and the gasket 160 through the bores or cylindrical openings 156 in the housing 153 because the apertures or cylindrical bores 156 are oversized with respect to the fasteners 190 where the air contacts the gasket 175. The gasket 175 with O-ring 187 will prevent any escape air. However, since the air enters the housing 153 through the bottom of the fastener 193 and the passageway 141*b*, it bears against the bottom of the piston head 173 and moves the piston to the position shown in FIG. 32 that is fully extended.

Figure 4:
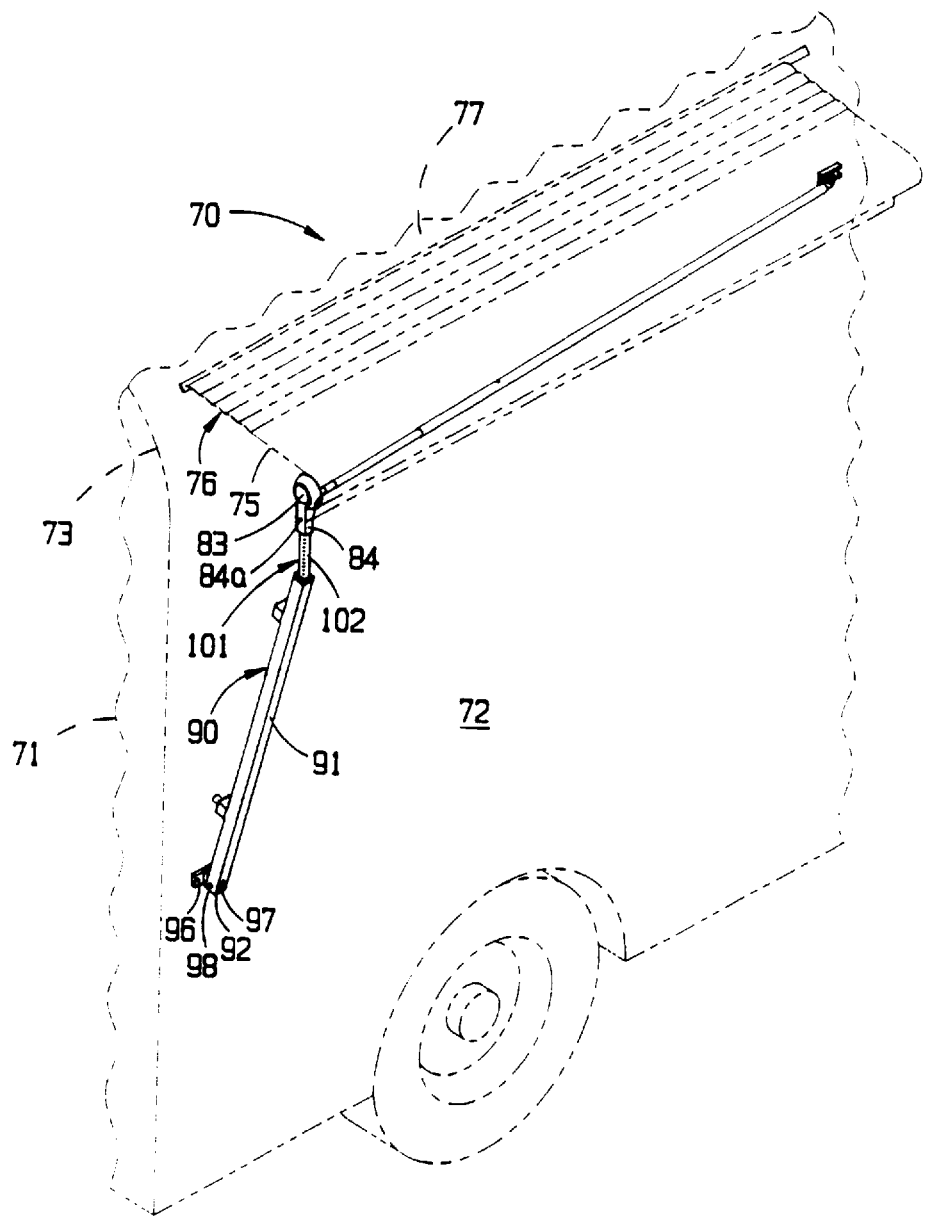
Figure 38:
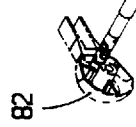
FIG. 38 is a view of the assembled arm assembly illustrated in FIG. 37 in the retracted position thereof.

When the push away cylinders 150 have the pistons 170 thereof in the fully extended position thereof, the awning 70 and particularly the support arms 90, see FIG. 4 and the roller assembly 80 are pushed away from the vehicle side 72 and beyond the pivot point of the support arm assemblies 90. The pivot point of the support arm assemblies 90 are the pins 98 which hold the support arm assemblies 90 to the mounting plate 95. Thereafter, gravity principally moves the awning 70 from the position illustrated at FIG. 4 to a position illustrated in FIG. 5 wherein the electric motor 88 having unwound several turns of the awning fabric 75 and the push-off mechanisms 150 having the pistons 170 thereof extended to the fully extended position, the support arm assemblies 90 have moved past the pivot point to a position that gravity will continue to move the awning 70. However, it may be that pressurized air activate the rafter arm assemblies 220 to assist in the push off movement previously described. As the awning 70 moves to the position illustrated in FIG. 4 to the position illustrated in FIG. 5, the rafter arm assemblies 220 move from a fully retracted position as illustrated in FIG. 38 to an extended position illustrated in FIG. 41.

Figure 5:
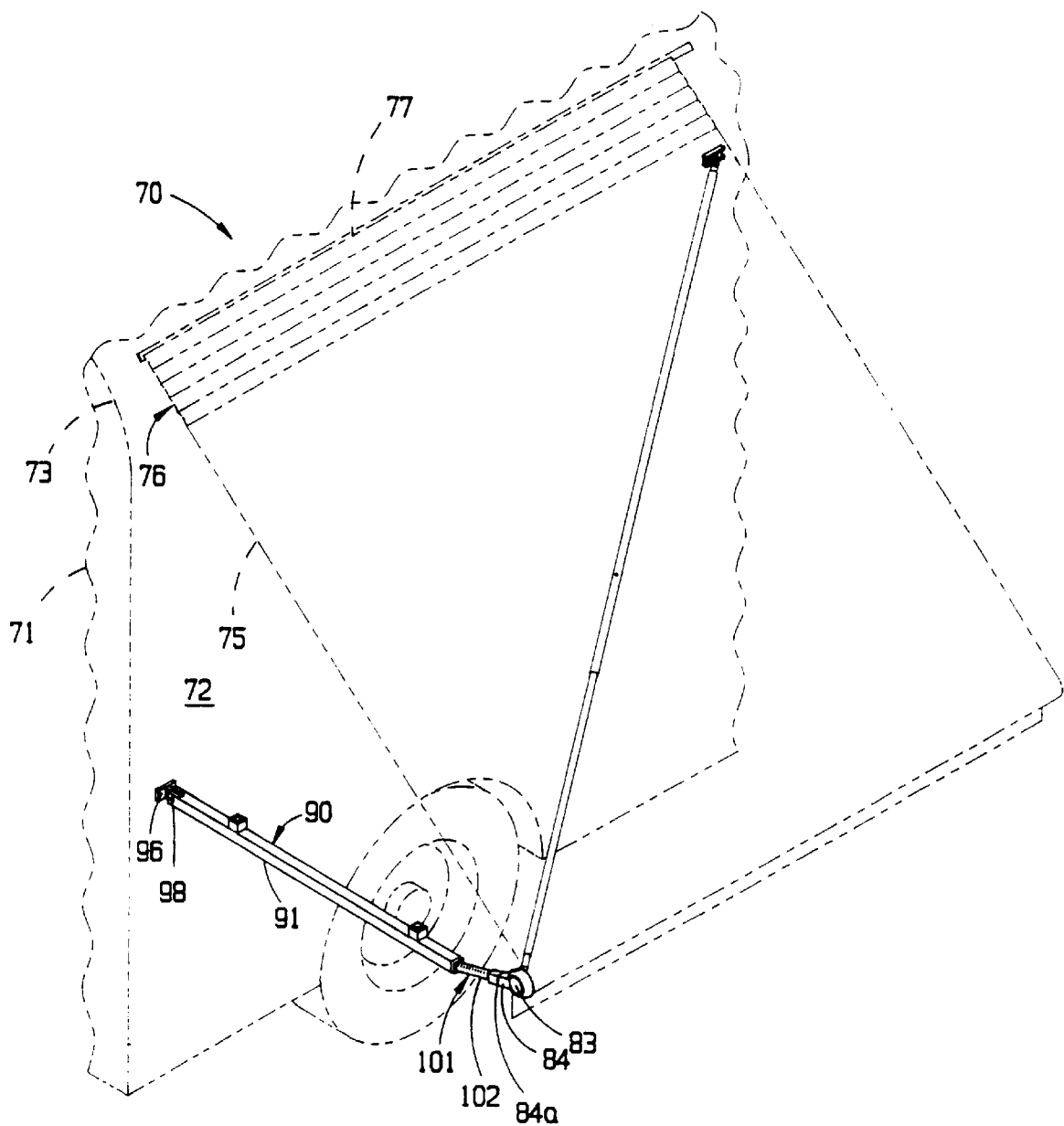
Figure 7:
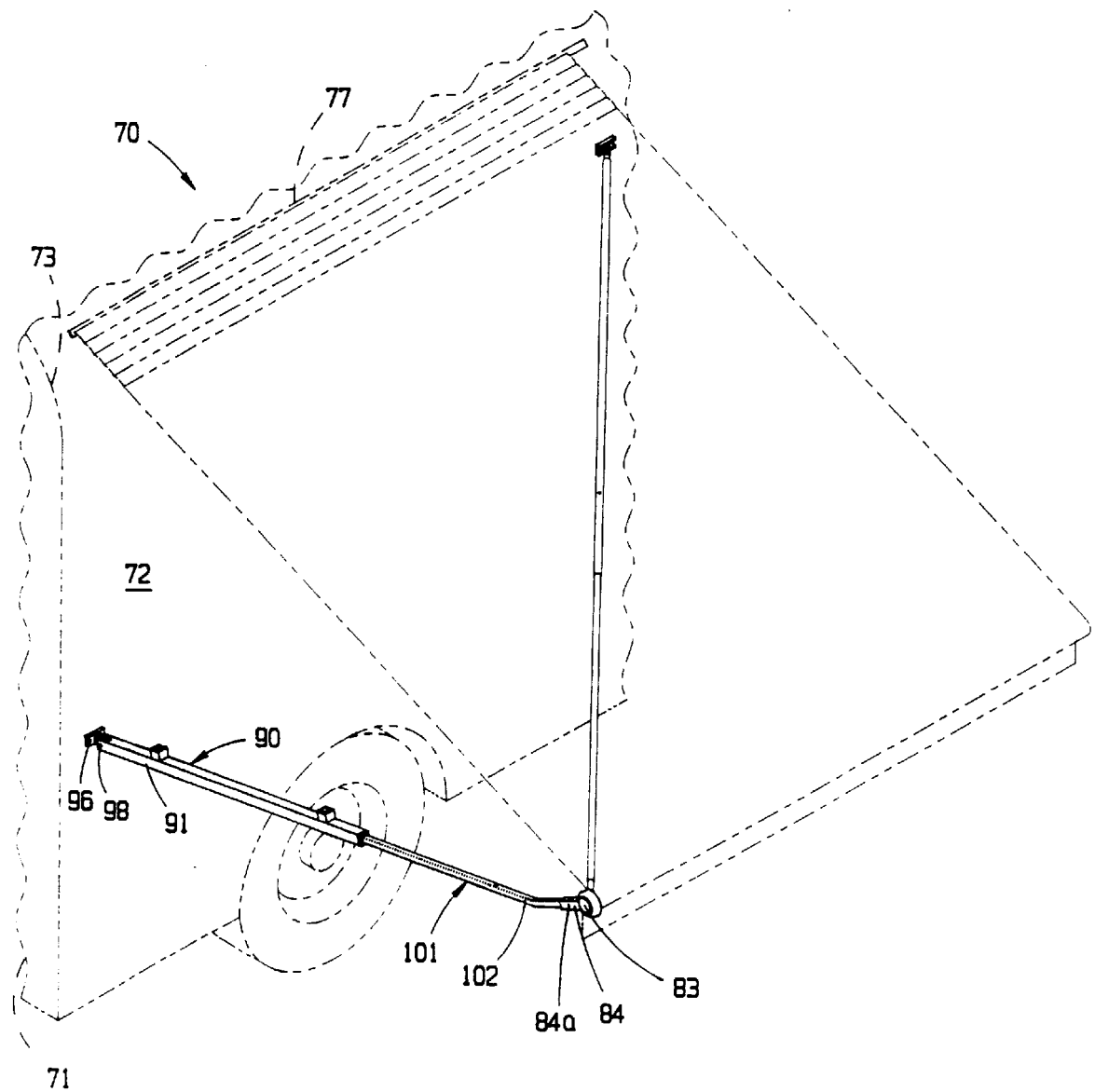
Figure 33:
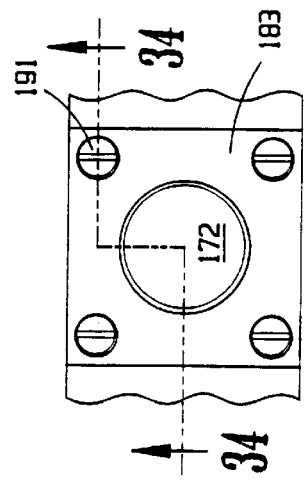
FIG. 33 is a top view of the push-off cylinder as illustrated in FIG. 31 in the retracted position thereof.

Movement of the rafter arm assemblies 220 from the retracted or fully collapsed position of FIG. 1 to the extended position illustrated in FIGS. 5 and 7 is accomplished by admitting pneumatic fluid, in the form of compressed air through a hose connected to fittings 231 which introduce air into the outer tube 222 to bear against the exposed surface of piston 240 to move the inner tube 221 with respect to the outer tube 222. Preferably, compressed air or other pneumatic fluid is admitted to the rafter arm assemblies 220 for a short period of time of about three seconds while the push-off mechanisms 150 are being pneumatically operated from their retracted position to their extended position. It should be noted that during the time that the push-off mechanisms 150 are moving to their fully extended position and the rafter arm assemblies 220 are being extended, the motor 88 is still unwinding the fabric 75. The motor 88 preferably continues to unwind the fabric 75 until substantially all of the fabric 75 is unwound or in the specific example hereinafter set forth for a period of approximately thirty-five seconds. It should be noted that in FIG. 5, the support arm assemblies 90 have still not extended beyond their retracted position, although they have pivoted from a position that is substantially parallel to the side 72 of the 71 to a position which is approximately perpendicular to the vehicle side 72. However, it may be that the support arm assemblies 90 may be extended earlier in the opening cycle, for instance when the fabric 75 is approximately half-way unrolled.

At this time, with the motor 88 still energized and the support arm locking mechanism 200 unlocked, the pneumatic fluid is introduced into the space between the support end cap 115 and the inner arm end cap and piston assembly 120 through the aperture 119 in the outer tubular member 91 of the support arm assemblies 90. The pneumatic fluid such as compressed air is transmitted from the compressor 330 illustrated in FIGS. 1–7 to the support assemblies 90 by a hose (not shown). The compressed air causes movement of the piston 120 from the position illustrated in FIGS. 20 and 23 along with the inner member assembly 100 and particularly the inner member 101 to the position illustrated in FIGS. 7 and 8 wherein the support arm assemblies 90 are in their fully extended and locked position. The support arm locking mechanism 200 is unlocked when the support arm 90 is in the full retracted position because either the aperture 104 is not provided or if the aperture 104 exists then introduction of air into the push-off cylinder 150 to move the piston 170 thereof to the extended position thereof automatically provides compressed air to the support arm locking assembly 200 to cause it to move from the normally biased locking position due to the spring mechanism 217 to the unlocked position, as previously described.

In the preferred embodiment, the support assemblies 90 are provided with compressed air for movement of the support arm assemblies 90 from their retracted position to their fully extended position (see FIGS. 28 and 29) for approximately ten seconds during which time the rafter arm assemblies 220 are also pressurized by pneumatic fluid, preferably compressed air, to move the rafter arm assemblies 220 to their fully extended position wherein they maintain the fabric 75 taut when the roller assembly 80 is in its extended position away from the vehicle 71.

Figure 6:
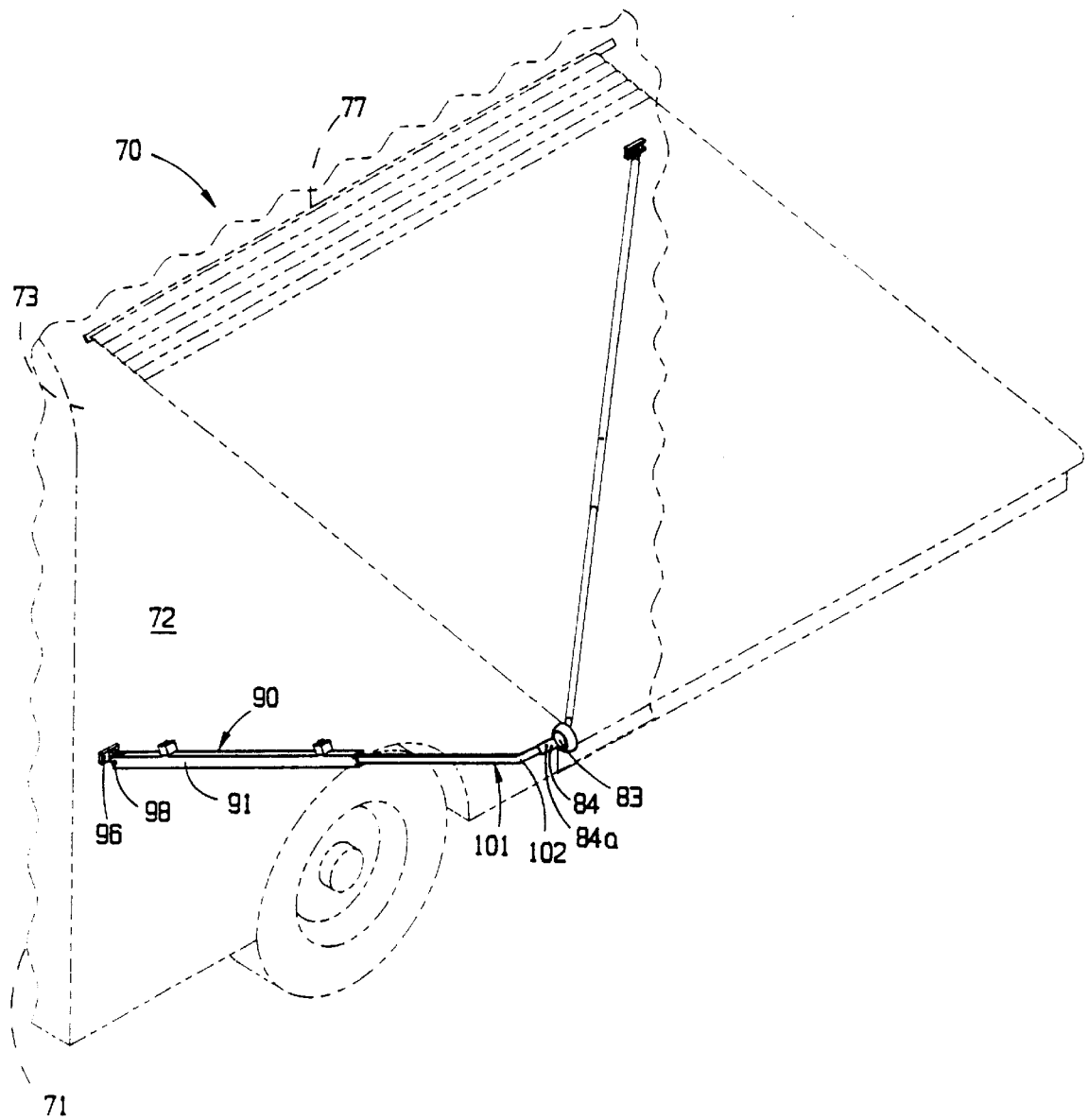

As seen during movement of the awning assembly 70 from the position illustrated in FIGS. 4 to that illustrated in FIGS. 5, 6 and 7, the rafter arm assemblies are under positive compressed air pressure or in another aspect, pneumatic fluid is introduced into the rafter arm assemblies 220 to cause them to move from their retracted or stored position to their extended position. This is accomplished as best seen in FIGS. 41–48 wherein pneumatic fluid in the form of compressed air is introduced into the outer rafter tube 222 through a fixture connected to internally threaded aperture 231 in the end plug 226. In a manner similar to that illustrated for the hose 265, a hose connected to a suitable fixture is threadedly mounted or connected to the end plug 226 and to the compressor 330 so that when a controller 335 actuates a valve assembly 340 operatively connected by conduits, not shown, to the various components hereinbefore described. Compressed air from the compressor 330 is thereafter introduced through the bore 229 into the outer tube 222. The compressed air then moves against the piston 240 and causes sliding movement of the piston 240 and the inner tube 221 with respect to the outer tube 222 which is accomplished in part by the fact that there are no apertures for the locking members 238 to snap into on the outer tubular member 222 when the rafter arm assembly 220 is in its retracted position. It is not until the rafter arm assembly 220 is close to its extended position that the apertures 224 and 224a–224d come into play.

In order to preclude the rafter arm lock mechanism 235 from engaging the apertures 224 and 224a–224b as the rafter arm 220 moves from its retracted to its extended position, the lock mechanism 235 is moved to its unlocked position relatively early in the sequencing step and preferably as the roller assembly 80 is being lowered by gravity and after the push-off mechanisms 150 are actuated. More specifically, in the preferred embodiment, from about five seconds after the opening cycle is begun and thereafter for a period of time until just before the opening cycle is completed the rafter arm locking mechanism 235 is in its unlocked position.

Figure 44:
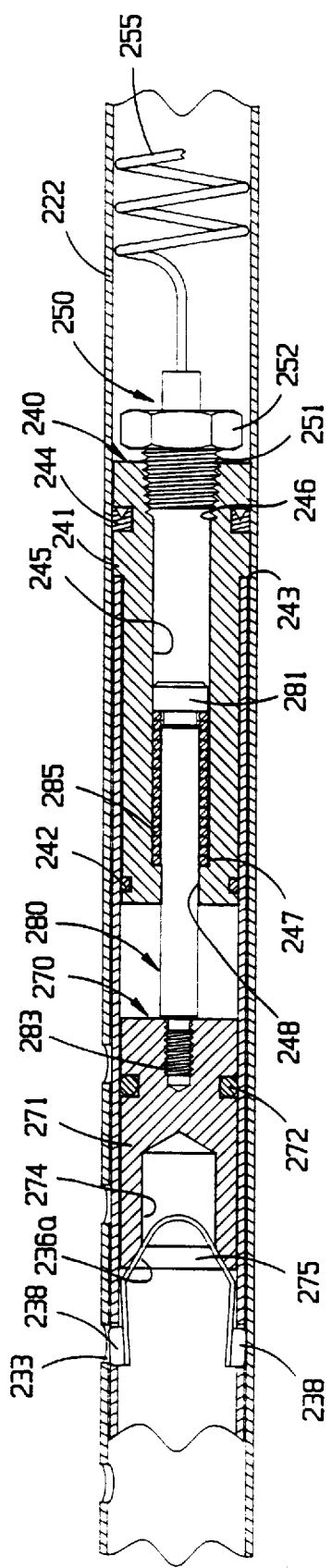
FIG. 44 is a view of the locking and unlocking mechanism illustrated in FIG. 42 partially in section wherein the pneumatically actuated mechanism ah moved the locking mechanism of the rafter assembly to the unlocked position thereof.

The rafter arm locking mechanism 235 as previously described, is normally biased toward its locking position because of the nature of the material from which the locking mechanism 235 is made. Preferably, it is a spring like metal which is biased to the locking position. In order for the locking mechanism 235 to be moved to the unlocking position, pneumatic fluid is introduced through the hose 265 and thereafter through the bore 228 and into the hose 255, the hose 255 having a coiled portion to accommodate expansion and retraction of the rafter arm assemblies 220 between the extended and the retracted positions thereof. When pneumatic fluid is introduced into the hose 255 it flows into the bore 245 and contacts the head 281 of the cam rod 280. The pneumatic fluid passes around the head 281 of the cam rod 280 and bears against the rafter arm lock cam assembly 270 to move the cam assembly forwardly from a position illustrated in FIG. 42 to the position illustrated in FIG. 44. When the position illustrated in FIG. 44 is reached, the frustoconical camming surface 275 on the rafter arm lock cam assembly 270 engage the portions 235a of the snap lock mechanism 235 to compress same forcing the locking members or the buttons 238 out of engagement with the apertures 224 and 224a–224d and the outer member 222. This permits sliding movement of the inner tube 221 with respect to the outer tube 222 due to the pneumatic fluid pushing against the rafter arm piston assembly 240.

Continued presence of pneumatic fluid in the form of compressed air in the tube 222 causes the rafter arm assembly 220 to extend beyond its fully extended and locked position so as to cause the awning fabric 75 to be in tension. Movement beyond the fully extended and locked position for the rafter arm assemblies 220 is accommodated by the spring mechanism 305 and the sliding relationship between the inner tubular member 221 and the stub rod or shaft 299 connected to the castings 82 and 83, providing resiliency such as with a shock absorber and adjustment to the final length of the rafter arm assemblies 220 for the awning 70 in its fully extended position.

After a period of time, the pneumatic fluid introduced into the hose 255 is released with the valve associated therewith allowing the fluid to be let out thereby freeing the spring 285 to move the cam rod 280 and the rafter arm lock cam assembly 270 connected therewith from the position illustrated in FIG. 44 to that illustrated in FIG. 42 allowing the lock mechanism 235 again to be urged to the locked position. Simultaneously, the spring 305 continues pushing against the stop 302 and the valving mechanism to the hose introducing pneumatic fluid or compressed air into the outer tubular member 222 is opened permitting relative movement of the inner and outer tubes 221 and 222 under the influence of the spring 305 until the button locking members 238c and appropriate aperture 224 or one of apertures 224a–224d become in registry at which time the buttons 238 engage and the rafter arm assembly 224 is in its extended and locked position.

At this time, the roller assembly 80 is in its extended position, the electric motor 88 has ceased to operate before the rafter arm assemblies 220 were fully pressurized, the support arm assemblies 90 are in their fully extended and locked position and the rafter arm assemblies 220 are in their fully extended and locked position. At this time, the awning is open. Thereafter, the valving is opened so that compressed air bleeds from the system leaving the spring biased rafter arm locking mechanism 235 locked and the support arm locking mechanism 200 locked.

The closing sequence of the automatic awning 70 is begun by pressurizing the rafter arm assemblies 220 and more particularly, pneumatic fluid such as compressed air is introduced into the outer tubular member 222 through the cylindrical bore 229 to act as a cushion during retraction of the rafter arm assembly 220 from the fully extended to the retracted position thereof. After compressed air is introduced into the outer tube 222, the snap lock mechanism 235 is moved to the unlocked position thereof by introducing compressed air through the hose 255 into the bore 245 to drive the rafter arm lock cam assembly 270 into engagement with the spring lock mechanism 235 causing the spring lock mechanism to move to its unlocked position, as illustrated in FIG. 44.

The rafter locking mechanism 235 remains in the open position for approximately 10 to 20 seconds during which time the support arm assemblies 90 are pressurized slightly again to provide a cushioning effect during movement of the support arm assemblies from the fully extended to the fully retracted or stored position thereof, which is accomplished by introducing compressed air through the openings 119 in the outer tubes 91. The support arm locking mechanisms 200 are moved to the retracted position thereof by introducing compressed air through the apertures 141b which move upwardly through the slot 162 in the gasket 160 and cause the piston 210 to move against the action of the spring 217 retracting locking member 215 from the aperture 103. This allows the dc electric motor 88 which is then activated in combination with the stored energy in the torsion spring 87 to roll up the roller assembly 80 and the fabric 75 connected thereto from the fully extended position to the stored position. The dc electric motor 88 is operated for a period of approximately between 30 and 35 seconds until the motor actuates a limit switch (not shown) interval to the motor which deactivates a motor permitting the natural braking action to lock the awning in place.

During the time that the support arm assemblies 90 are moving from their extended position to their retracted position, the motor 88 and torsion spring 87 are moving the roller assembly 80 and the fabric 75 connected thereto from the extended to the stored position thereof. Push-off mechanisms 150 and the locking mechanisms 200 are retracted so that when the awning 70 is in its fully stored position with the slatted metal cover 77 wrapped around the awning fabric 75 and the support arms 90 in their fully retracted position with the rafter arm assemblies 220 in their fully retracted position, the push-off mechanisms 150 are in the position illustrated in FIGS. 10 and 12, that is in the fully retracted position and the support arm assembly locking mechanism 200 is unlocked if the aperture 104 is not present. If the aperture 104 is present, then the spring mechanism 217 will cause the locking mechanism 200 to move to its locking position when the locking member 215 is in registry with the aperture 104. Preferably, the aperture 104 is not present but it is clearly possible that an alternative design would include same.

Figure 3:
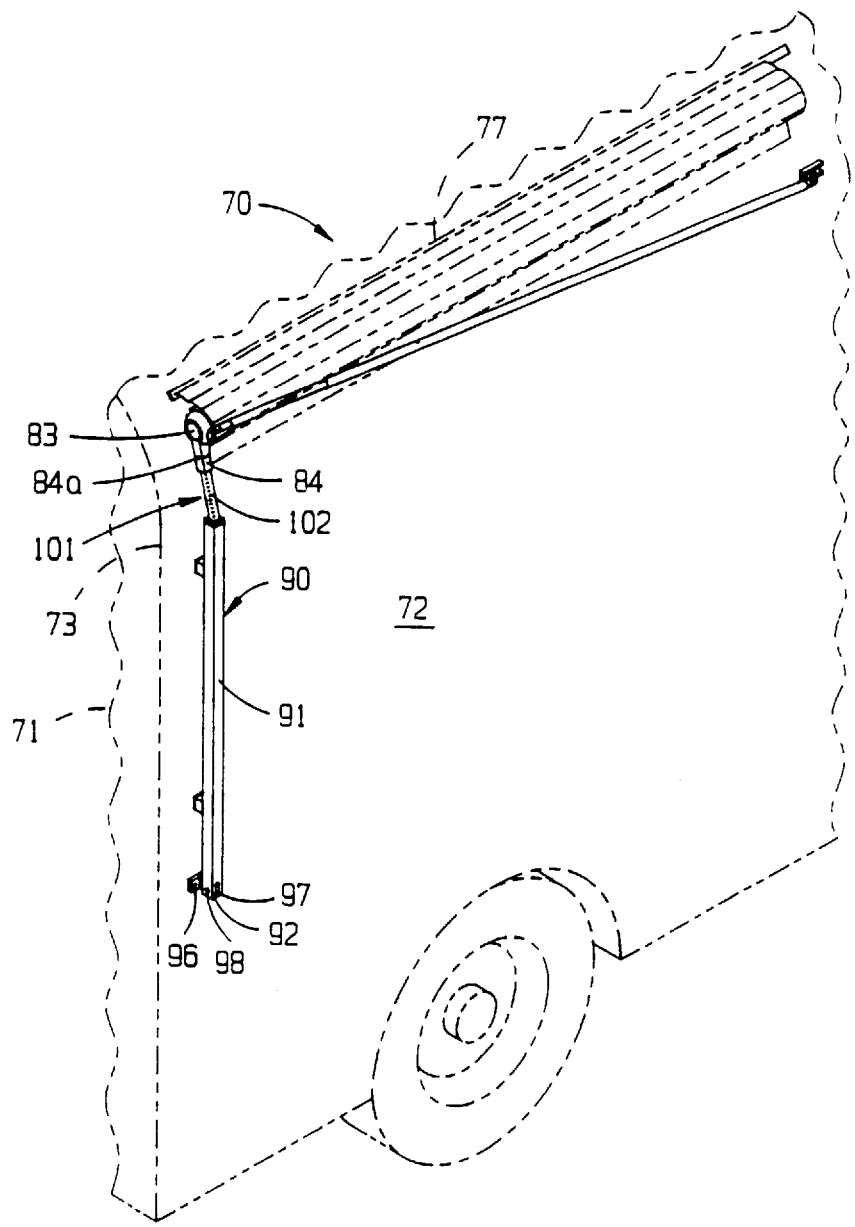
FIGS. 3–7 are views showing the sequential movement of the awning from the stored to the fully extended position thereof.
Figure 49:
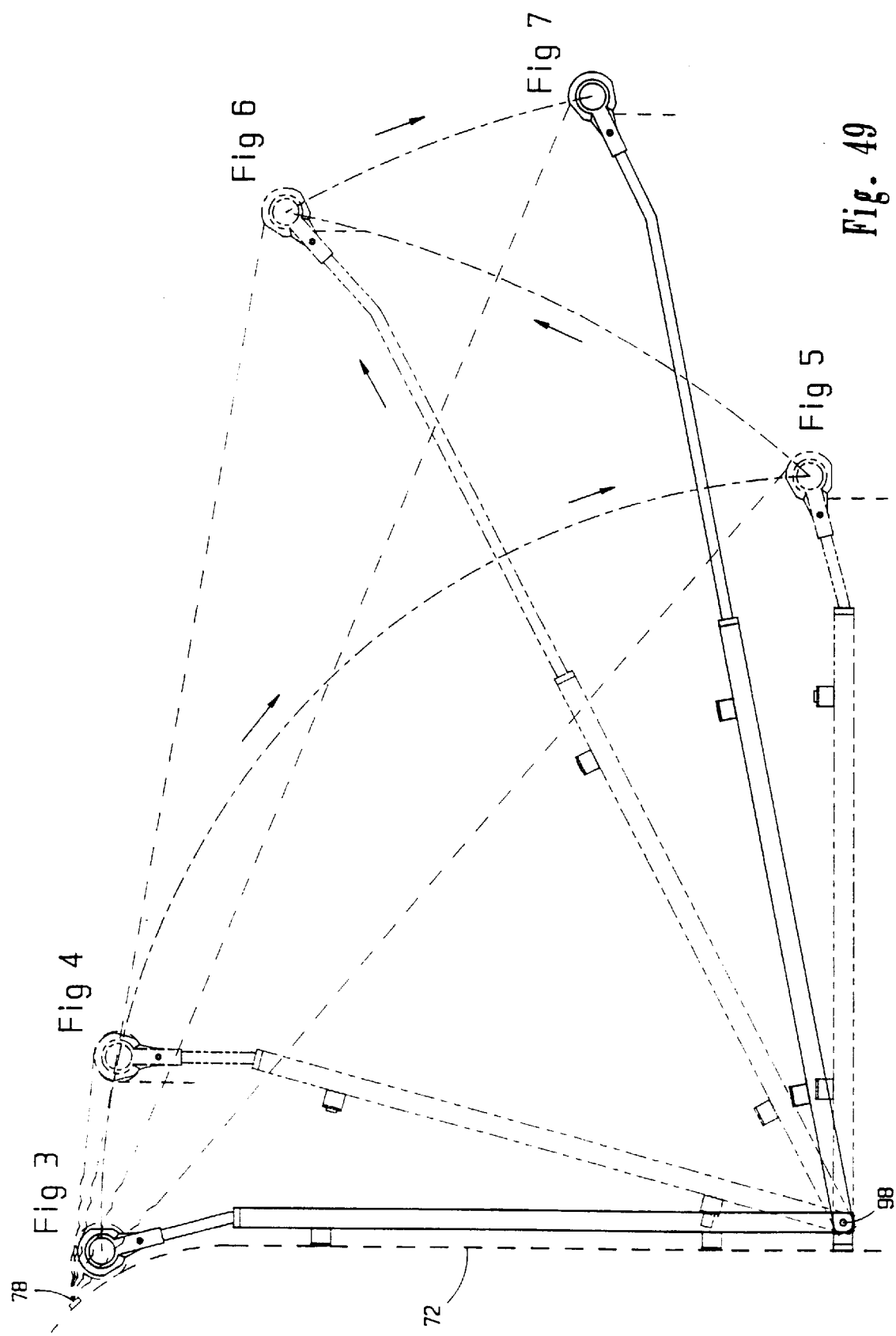
FIG. 49 is a schematic representation of the position of the various awning constituents during movement between the closed or storage position and an open or extended position thereof.

Referring now to FIG. 49, it can be seen that when the awning 70 is fully closed in its storage position as illustrated in FIG. 1 of the drawings, the support arm assemblies 90 or at least a substantial portion thereof are substantially vertical and parallel to the side 72 of the recreational vehicle 71. The various spatial positions of the awning 70 is indicated in FIG. 49 during movement of the awning between the stored or closed position and the open or extended position. As the opening cycle begins, and the electric motor 88 is activated, fabric 75 is unwound, as seen in FIG. 3, and thereafter the push-off mechanism 150 is actuated, as seen in FIG. 4 and the support arm assemblies 90 move to the position indicated by FIG. 4 in FIG. 49. As the awning assembly 70 moves from the position of FIG. 4 to FIG. 5, as illustrated in FIG. 49, the support assemblies 90 move to a horizontal position and the rafter arm assemblies 220 begin their extension. Movement of the awning 70 from FIG. 5 to FIG. 6 illustrates the movement of support arm assemblies 90 from their retracted position although not close to the vehicle as in the storage position in FIG. 5 (but not their stored position) to their extended position in FIG. 6. At this time, the rafter arm assemblies 220 are preferably not pressurized until the support arm assemblies 90 are fully extended as seen in FIG. 6 at which time movement from FIG. 6. It may be that the rafter arm assemblies 220 are pressurized earlier in the cycle.

Preferably, the distribution of pneumatic fluid in the form of compressed air is controlled at this time by a board level programmable controller made by TROL Systems, Inc.

which may be remotely operated by a suitable RF transmitter or the like and a six station, three way solenoid operated valve assembly produced by Mack Valves, Inc. of Wixom, Mich., is used in combination therewith to direct compressed air from a compressor as illustrated in FIG. 1 to the various and appropriate pneumatically operated or assisted parts as previously described, other vendors are available.

Figure 52:
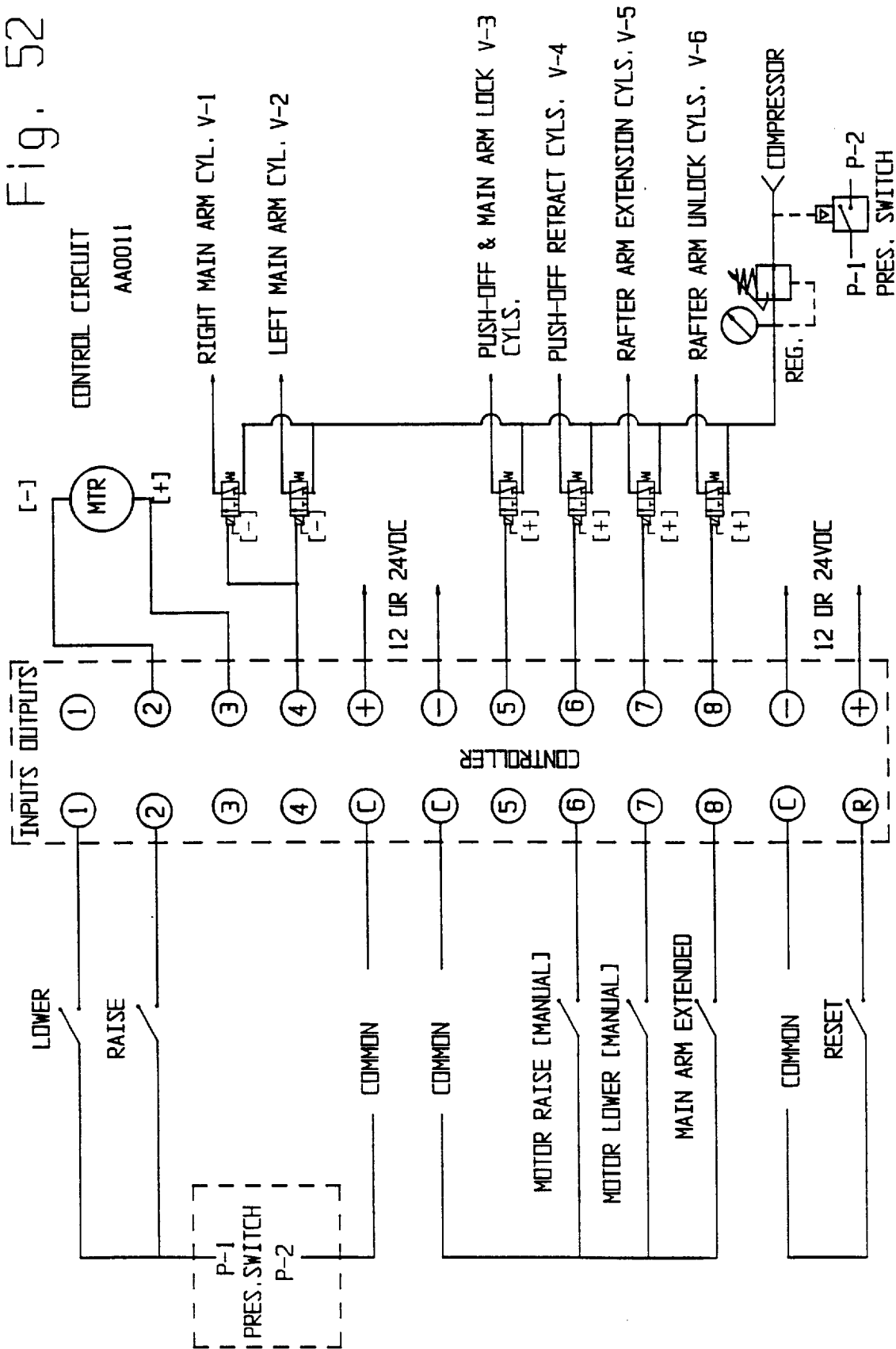
FIG. 52 is a control circuit diagram for operating the electrical portion of the control mechanism.

FIGS. 50 and 51 illustrate two program codes showing the sequential operation on the output controller 335 and valving mechanism 340 on the controller which operates the valving mechanism in order to direct the compressed air among the various parts of the present invention. FIG. 52 shows a representative control circuit for the operation of the present invention; however, it is understood that various modifications are within the skill of the art and FIG. 52 is for purposes of illustration only.

Another important feature of the invention is the use of the two way air piston assembly used for the push-off cylinder assemblies 150 and the locking cylinder assemblies 200 previously described. These mechanism are novel in combination with the overall concept of operating an electrically and pneumatically actuated automatic awning providing a new and useful invention in the recreational vehicle art.

While there has been disclosed what is considered to be the preferred embodiment of the present invention, it is understood that various changes in the details may be made without departing from the spirit, or sacrificing any of the advantages of the present invention.

I claim:

1. A support arm for an awning mounted to a vehicle, said arm comprising an elongated tubular outer member capable of being connected at one end to a vehicle, a plurality of axially extending channels in said tubular outer member, a tubular inner member slidably received in said outer member and having one closed end thereof forming a piston near the end of said outer member capable of being connected to the vehicle, means for introducing pressurized fluid into said outer member to force said piston therealong and for introducing pressurized fluid to said axially extending channels, a push-off cylinder and locking mechanism mounted on said outer member in fluid communication with said axially extending channels to accommodate introduction of pressurized fluid to said push-off cylinder and to said locking mechanism.

2. The support arm of claim 1, wherein the fluid communication between said tubular outer member and said push-off cylinder and said locking member includes threaded fasteners connecting said push-off cylinder and said locking mechanism to said outer tubular member, said threaded fasteners having slots therein providing a pathway for the pressurized fluid.

3. The support arm of claim 2, and further including a gasket intermediate said outer member and said push-off cylinder, said gasket having an opening therein for passing pressurized fluid along selected ones of said slotted threaded fasteners.

4. The support arm of claim 2, and further including a gasket intermediate said outer member and said locking mechanism, said gasket having an opening therein for passing pressurized fluid along selected ones of said slotted threaded fasteners.

5. The support arm of claim 1, wherein said tubular outer member is square in transverse cross-section and said push-off cylinder and said locking member each include a housing member square in transverse cross-section having the same transverse dimensions as said outer tubular member.

6. The support arm of claim 1 and further including conduit means in said tubular inner member for carrying electrical connectors.

* * * * *